US008960592B1

(12) United States Patent
Windisch

(10) Patent No.: US 8,960,592 B1
(45) Date of Patent: Feb. 24, 2015

(54) VTOL PROPULSION FOR AIRCRAFT

(76) Inventor: D. Anthony Windisch, Edmond, OK (US)

( * ) Notice: Subject to any disclaimer, the term of this patent is extended or adjusted under 35 U.S.C. 154(b) by 168 days.

(21) Appl. No.: 13/553,080

(22) Filed: Jul. 19, 2012

Related U.S. Application Data

(60) Provisional application No. 61/509,480, filed on Jul. 19, 2011.

(51) Int. Cl.
*B64C 29/00* (2006.01)
*B64D 35/00* (2006.01)
*B64D 33/02* (2006.01)

(52) U.S. Cl.
USPC .................. 244/12.5; 244/52; 244/53 B

(58) Field of Classification Search
CPC ........ B64D 35/00; B64D 35/02; B64D 35/04; B64D 35/06; B64D 35/08; B64C 2201/042; B64C 2201/044; B64C 2201/048; B64C 29/0066
USPC ... 244/52, 73 R, 76 J, 12.3, 23 B, 12.5, 23 D, 244/53 R, 53 B; 60/226.3; 446/58, 57
See application file for complete search history.

(56) References Cited

U.S. PATENT DOCUMENTS

| | | | | |
|---|---|---|---|---|
| 2,840,324 A | * | 6/1958 | Smith ............................. 244/52 |
| 2,961,198 A | | 11/1960 | Stevens |
| 3,056,258 A | * | 10/1962 | Marchant et al. ............... 244/52 |
| 3,073,548 A | | 1/1963 | Marsh |
| 3,117,750 A | | 1/1964 | Snell |
| 3,154,917 A | | 11/1964 | Williamson |
| 3,160,368 A | * | 12/1964 | Young et al. ................. 244/76 J |
| 3,190,584 A | * | 6/1965 | Gire et al. ........................ 244/52 |
| 3,191,886 A | * | 6/1965 | Lewis et al. ................. 244/23 R |
| 3,318,095 A | | 5/1967 | Snell |
| 3,528,247 A | | 9/1970 | Riemerschmid |
| 3,893,638 A | * | 7/1975 | Kelley ......................... 244/12.5 |
| 4,151,714 A | * | 5/1979 | Scrace ......................... 60/226.3 |
| 4,343,446 A | * | 8/1982 | Langley ....................... 244/73 R |
| 4,474,345 A | | 10/1984 | Musgrove |
| 4,550,877 A | | 11/1985 | Szuminski |
| 4,679,732 A | | 7/1987 | Woodward |
| 4,782,657 A | * | 11/1988 | Lewis et al. ................. 244/12.5 |
| 4,850,535 A | | 7/1989 | Ivie |
| 5,082,181 A | | 1/1992 | Brees et al. |
| 5,161,741 A | | 11/1992 | Seyfang |
| 5,297,388 A | | 3/1994 | Nightingale |
| 5,383,332 A | | 1/1995 | Angel |
| 5,390,877 A | | 2/1995 | Nightingale |
| 5,464,175 A | | 11/1995 | Short |
| 5,507,453 A | | 4/1996 | Shapery |
| 5,666,803 A | | 9/1997 | Windisch |
| 5,706,650 A | | 1/1998 | Thayer |

(Continued)

*Primary Examiner* — Tien Dinh
*Assistant Examiner* — Richard R Green
(74) *Attorney, Agent, or Firm* — Fellers, Snider, Blankenship, Bailey & Tippens, P.C.

(57) ABSTRACT

An aircraft, such as a radio controlled aircraft, capable of vertical take-off and landing. The aircraft has a compressor in a fuselage that contains an interconnected first and second fans driven by a motor. An intake provides air to the first fan, while a bypass duct directs airflow to the second fan. Air flow from the first fan to the second fan is controlled by a valve, which is operated in tandem with doors in the bypass duct. Nozzles direct air flow out of the compressor in a selected one of a vertical or non-vertical direction for conventional flight or for hover. Hover tubes are provided to adjust the aircraft in pitch, yaw and roll. The hover tubes operate simultaneously with conventional flight controls.

21 Claims, 21 Drawing Sheets

(56) References Cited

U.S. PATENT DOCUMENTS

| | | |
|---|---|---|
| 5,720,453 A | 2/1998 | Platt |
| 5,769,317 A | 6/1998 | Sokhey et al. |
| 5,803,199 A | 9/1998 | Walter |
| 5,820,024 A | 10/1998 | Ausdenmoore et al. |
| 6,105,901 A | 8/2000 | Ulanoski et al. |
| 6,170,778 B1 | 1/2001 | Cycon et al. |
| 6,269,627 B1 | 8/2001 | Freese et al. |
| 6,270,038 B1 | 8/2001 | Cycon et al. |
| 6,343,768 B1 | 2/2002 | Muldoon |
| 6,581,537 B2 | 6/2003 | McBride et al. |
| 6,648,268 B2 | 11/2003 | DuPont |
| 6,808,140 B2 | 10/2004 | Moller |
| 6,857,597 B2 | 2/2005 | DuPont |
| 6,918,244 B2 | 7/2005 | Dickau |
| 6,938,408 B2 | 9/2005 | Lair |
| 7,032,861 B2 | 4/2006 | Sanders, Jr. et al. |
| 7,096,662 B2 | 8/2006 | Wehner |
| 7,159,817 B2 | 1/2007 | VanderMey et al. |
| 7,249,732 B2 | 7/2007 | Sanders, Jr. et al. |
| 7,364,115 B2 | 4/2008 | Parks et al. |
| 7,475,548 B2 | 1/2009 | Toffan et al. |
| 7,540,450 B2 | 6/2009 | Brand et al. |
| 7,581,381 B2 | 9/2009 | Bryant |
| 7,658,346 B2 | 2/2010 | Goossen |
| 7,665,689 B2 | 2/2010 | McComb |
| 2008/0127629 A1* | 6/2008 | Chang .......................... 60/228 |

* cited by examiner

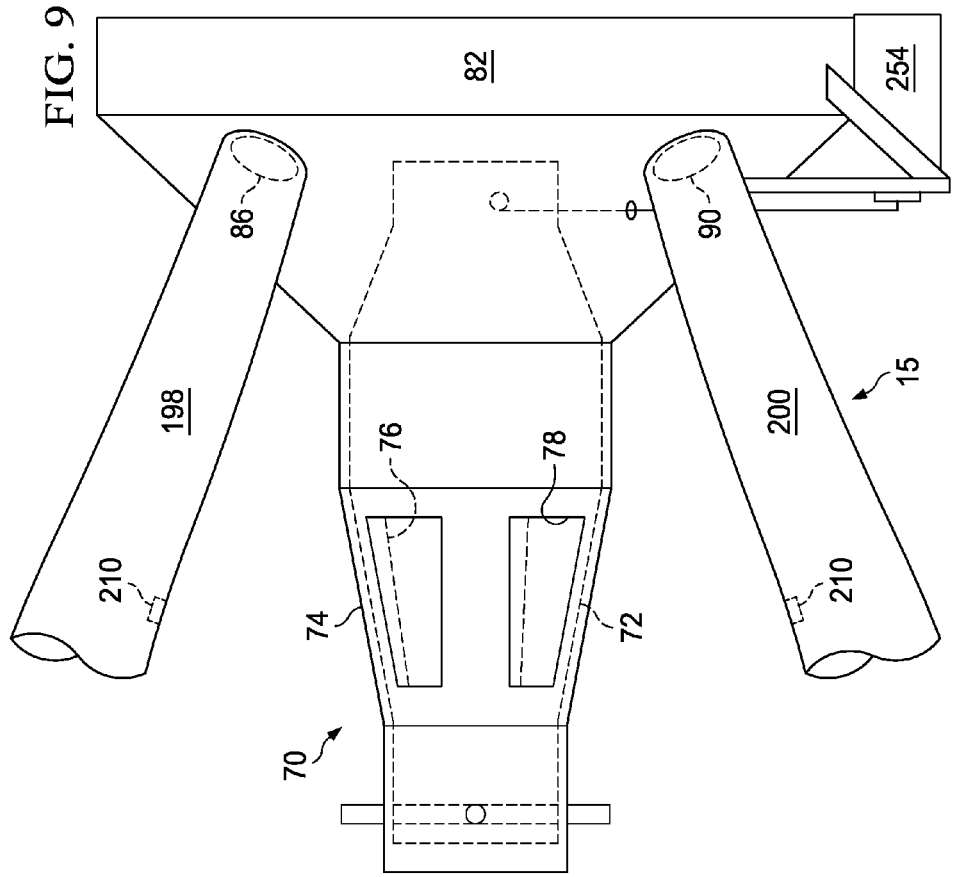

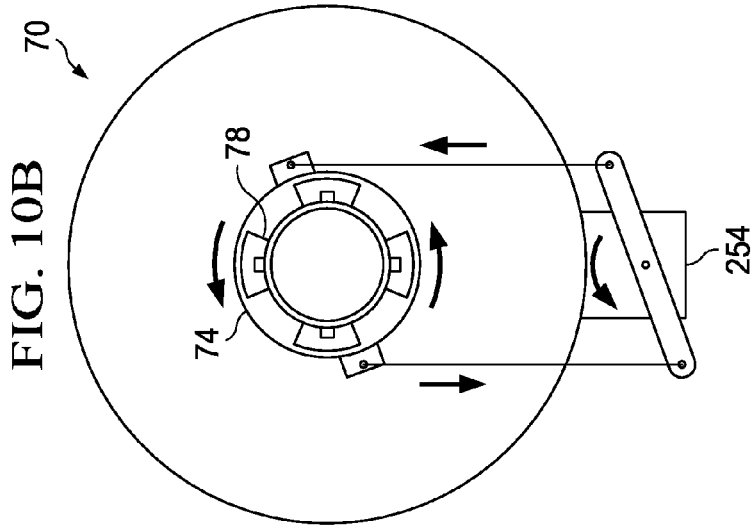
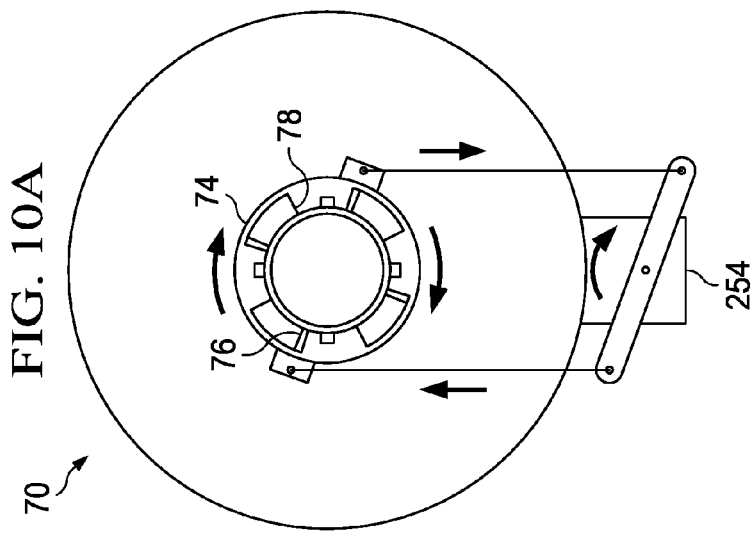

VTOL PROPULSION FOR AIRCRAFT

CROSS REFERENCE TO RELATED APPLICATIONS

This application claims the priority of U.S. Provisional Patent Application No. 61/509,480 entitled "VTOL PROPULSION FOR UAV," filed Jul. 19, 2011, the contents of which are hereby incorporated by reference.

FIELD OF THE INVENTION

An improved Hover-Jet VTC with design features to improve efficiency.

BACKGROUND OF THE INVENTION

Previous design components for a hover jet VTC were articulated in U.S. Pat. No. 5,666,803, which is hereby incorporated by reference.

Vertical and/or short take-off and landing (V/STOL) is a term used to describe airplanes that are able to take-off or land vertically or on short runways. Vertical takeoff and landing (VTOL) describes craft that do not require runways at all. Generally, a V/STOL aircraft needs to be able to hover.

The ability for a V/STOL aircraft to hover relies on an ability to manipulate forces for roll, yaw, and pitch. An ability to control roll, yaw and pitch while hovering is necessary for manned aircraft as well as aircraft models.

One type of manned V/STOL aircraft relies upon jet propulsion, e.g, the Harrier "jump jet". For aircraft modelers, one approach is to power the model aircraft with a ducted fan driven by a high-speed engine. The engine turns a multi-bladed fan mounted inside a circular housing (the duct), and the fan unit produces thrust which pushes the model through the air. With a ducted fan the entire power plant can be hidden inside most models, thus allowing for the building of realistic replicas of jet aircraft. Further, ducted-fan models have many of the flight characteristics of full-size jet aircraft, offering new challenges to radio-control pilots. An excellent source of background material on ducted-fan aircraft is Building & Flying Ducted-fan RC Aircraft, by Dick Sarpolus, published in 1981 by Kalmback Publishing Co.

Difficulties in achieving hover to horizontal flight have, for the most part, stymied the developers of lightweight remotely controlled aircraft. Only recently was the chasm from vertical to horizontal flight and back successfully traversed. See R/C VTOL Makes History, by John A. Gorham, published in the October 1993 issue of Model Airplane News. However, the VTOL radio-controlled aircraft which first successfully navigated transitory flight looks and behaves a far cry from the sleek and stylish Harrier. The Grumman Electronics Systems' ⅓-scale R/C model of a proposed VTOL aircraft utilized twin rotatable, externally mounted ducted-fan engine and fan combinations employing a vane-control system manipulated by flight-control servos. Though conquering transitory flight, the Grumman project did not provide aircraft modelers with a workable R/C power plant for internal mounting in made-to-scale fighter aircraft models.

SUMMARY OF THE INVENTION

This disclosure outlines a propulsion system that utilizes an aircraft engine having a ducted fan with applied turbine dynamics used to achieve vertical flight. The invention of the application harnesses thrust generated by a dual inline ducted fan design to provide smooth reliable and directable propulsion. The two ducted fans are configured to generate a dense air mass that can be angled downwardly for vertical flight or hover and can be angled backwards for forward flight.

One aspect of the invention is a compressor modified to manipulate and generate a large dense air mass to provide steady and reliable thrust for flight. Directing thrust for specific maneuvers is another aspect of the invention. The apparatus of the invention includes an engine that can operate an aircraft vertically into hover, control the hover against gravity, effect orientation at pilots command, transition into forward flight and equally perform the process in reverse to land.

The basic design is two ducted fans connected by a single drive shaft powered by a motor and transmission. The design incorporates the fan ducts into a casing. The casing consists of the intake, duct and thrust vectoring extensions and all needed mountings. The entire assembly is sealed air tight to create a de-facto pressure chamber. The thrust generated by the fans is forced through the casing assembly and enhanced. Natural and artificially induced vacuums are augmented by pressure rings, valves, vortices generators and adjustable fins, flaps, and strakes. The airflow is adjusted, drawn, directed and aligned to glean maximum saturation, rotation and air mass cohesion under controllable pressure dictated by the casing shape.

One aspect of the invention is the use of elastic properties of air to induce an efficient but temporary vacuum, which increases overall ram effect throughout the system. In turn, each fan's thrust is augmented through a thrust vectoring duct as airflow is divided out and into four ports. In one embodiment, the ports are fitted with nozzles that can be rotated 15 degrees down or aft.

The thrust vectoring duct is shaped to promote vacuum generation and maintain air mass pressure. The configuration is designed to actualize a high vacuum that exists between the fans. To control that vacuum use it to influence the air volume drawn into the system through the thrust vectoring duct, the thrust can be directed in specific directions. Additional vortices generators are embedded within the casing, thereby adding to air mass volume induction and pressurization.

Although the invention is discussed primarily in the context of a radio controlled aircraft, the design of the application is not limited to size or scale. The parts described herein may be used to construct a structure can incorporate r/c type pieces or turbine components equally with predictable performance capacity. Due to the basic physics and design principles, the design of the invention is adaptable.

A preferred embodiment for the design of the invention uses injection molded polyester plastic. A component plastic sub frame is integrated with a compressor. The sub-frame and compressor is encased in a two piece styrofoam airframe. The airframe consists of a body fuselage and a wing avionics assembly.

In one embodiment, the solid core body is formed around the compressor sub frame, cast in foam and shaped to resemble a Harrier jump jet. The fuselage structure provides support for the aircraft nose and tail assemblies. It also incorporates the wing attachments in the sub-frame and landing gear.

The wing attaches to the body by a pin connection through the front sub-frame mount and by screws to the rear sub-frame plank mounts. The pin-screw connection enables stability using a carbon fiber reinforced Styrofoam wing. The wing includes the hover control assemblies, air source vent connections and servo actuators.

BRIEF DESCRIPTION OF THE DRAWINGS

FIG. 9 shows an internal view of the cone valve of FIGS. 5, 6, and 8;

FIG. 10 is an end view of the cone valve assembly of FIG. 9 shown in an open and in a closed configuration;

DETAILED DESCRIPTION OF THE PREFERRED EMBODIMENTS

The basic system of the invention includes two fans, a drive train assembly, two thrust vectoring chambers, four nozzles, and an intake shroud. Each component adjoins to other units to make up a compressor. Each unit is individualized to perform specific tasks or operations. All the sub systems interact to control the compressor operation during hover and forward flight.

Figure 1:
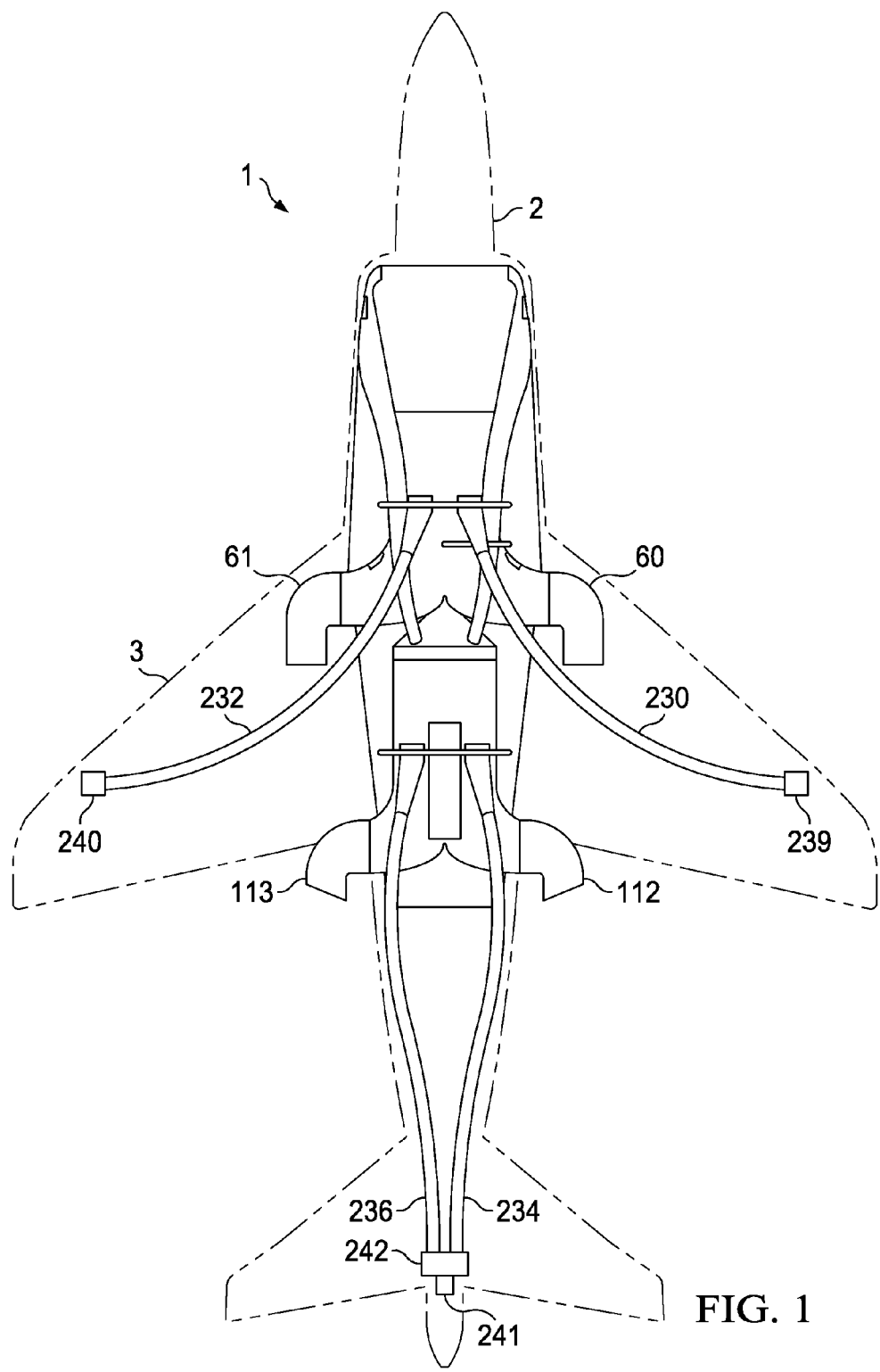
FIG. 1 is a schematic plan view of an aircraft of the invention showing rotatably mounted nozzles and hover controls.

Referring first to FIG. 1, shown is a plan view of a typical aircraft 1. Aircraft 1 has a fuselage 2, wing section 3, and tail section 4. A casing 10 is located with the fuselage 2 for compressing and directing airflow.

Figure 2:
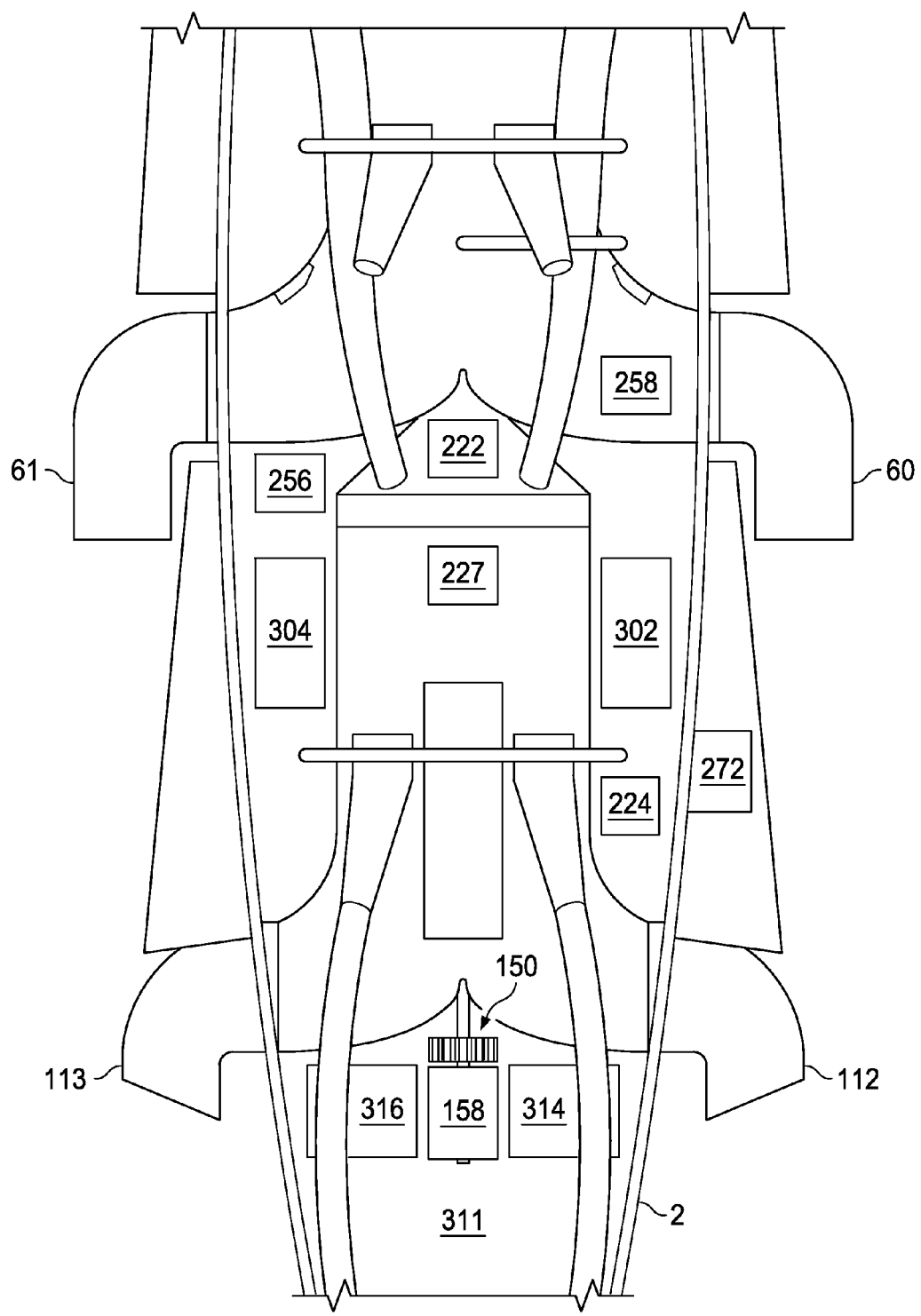
FIG. 2 is a plan view of the aircraft of FIG. 1 showing internal components including the casing.

FIG. 2 shows a plan view of the interior of fuselage 2 after wing section 3 is removed. Visible is casing 10 and various components to be discussed hereafter.

Figure 3:
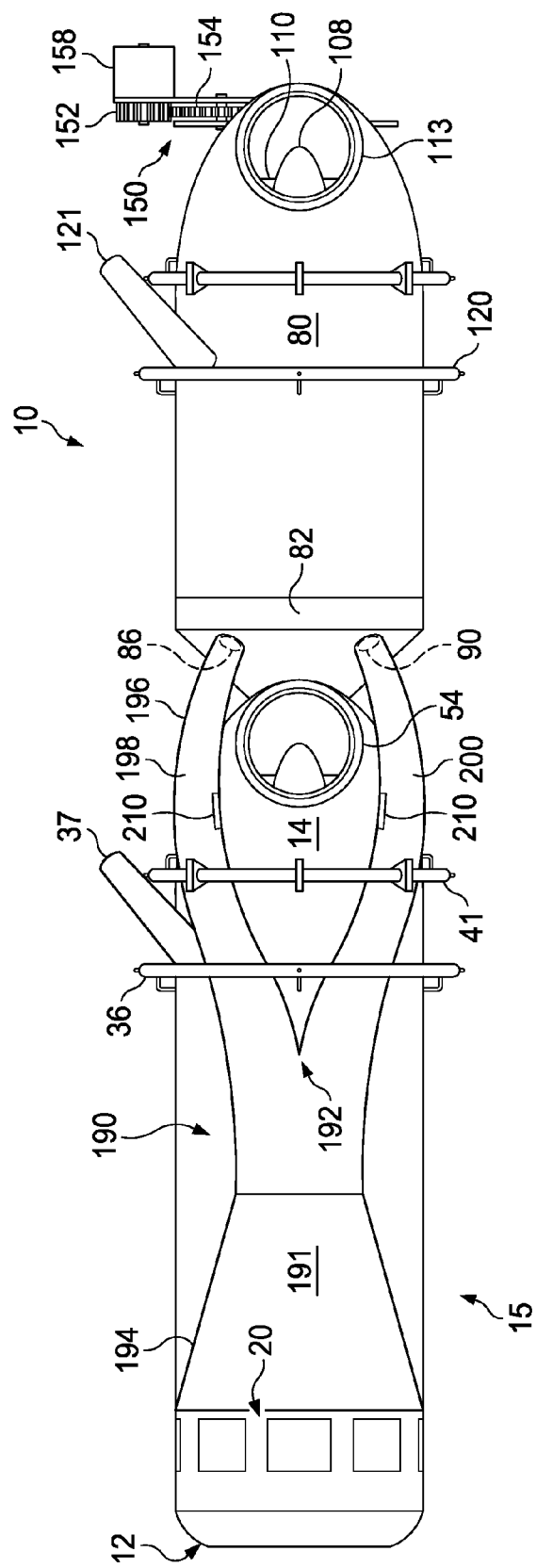
FIG. 3 is a side view of the casing duct assembly of FIG. 2.
Figure 4:
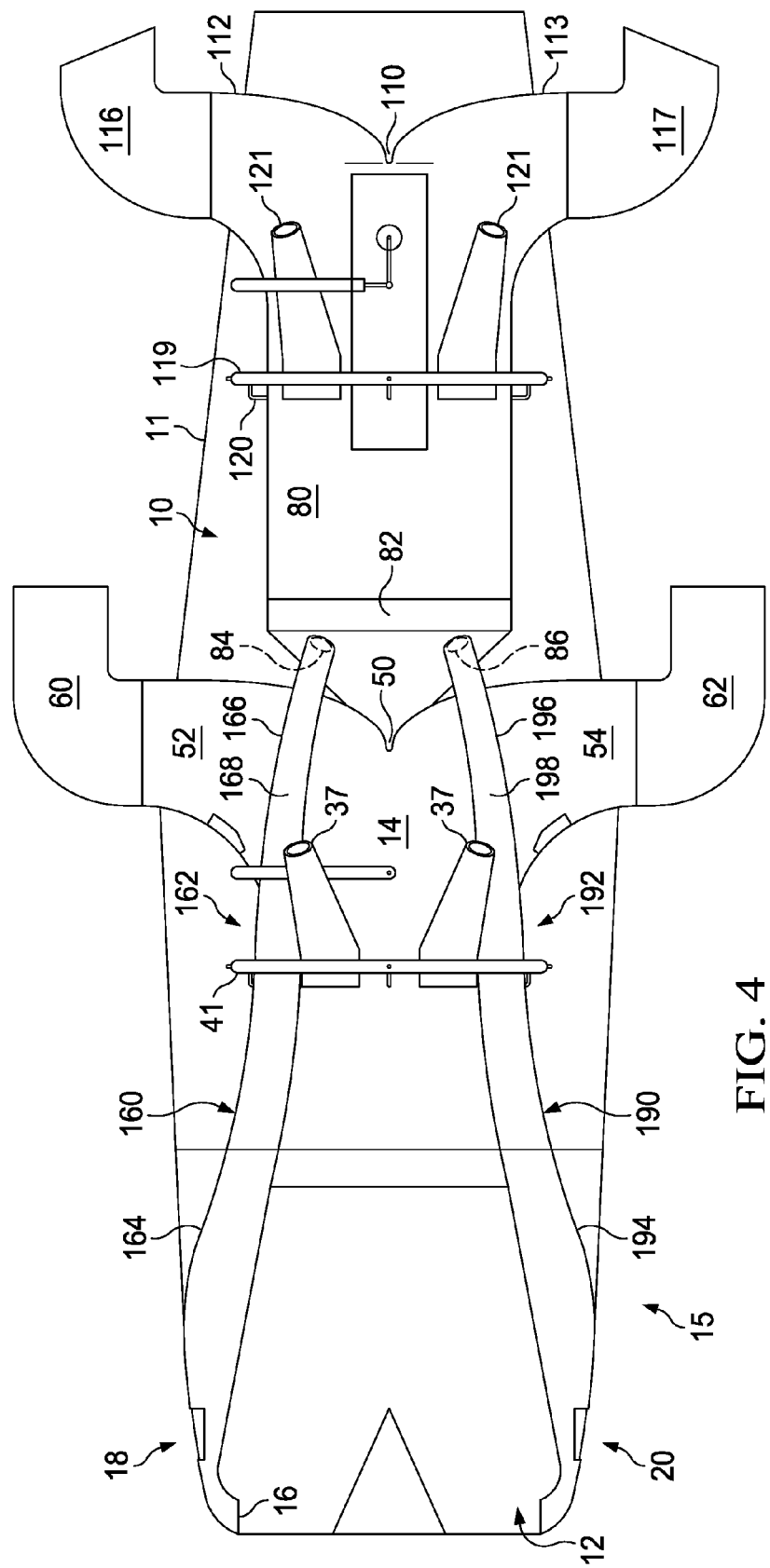
FIG. 4 is a plan view of the casing duct assembly of FIG. 2 shown placed within a sub-frame.
Figure 5:
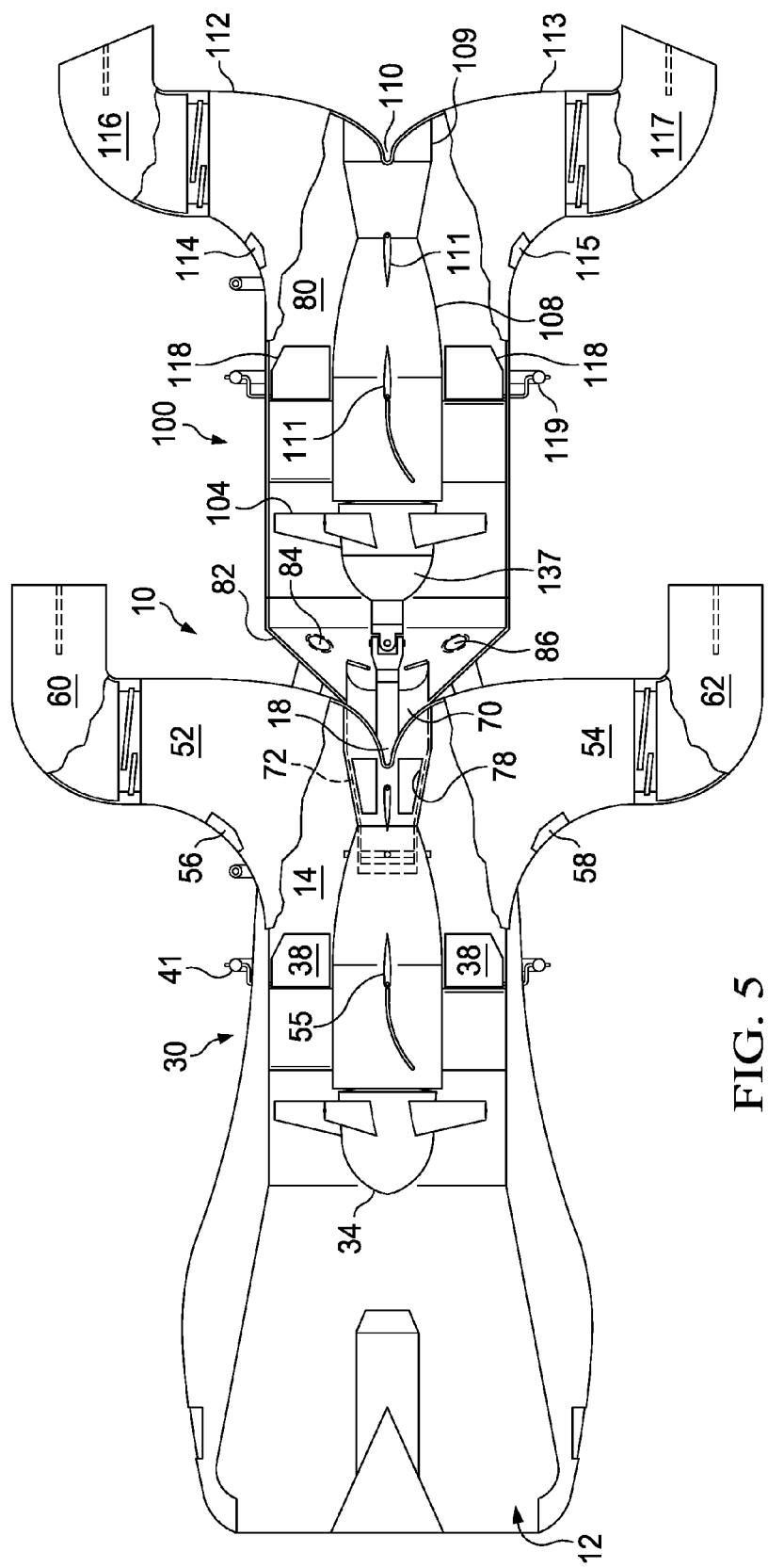
FIG. 5 is a partial cut away plan view of the casing duct of FIG. 2.

Casing 10 is located within subframe 11. Referring now to FIGS. 3-5, casing 10 defines an intake shroud 12 on a front end. Casing 10 further defines a first duct chamber 14 that tapers from front to back.

Bypass duct assembly 15 is adjacent to and partially surrounds casing 10. Intake shroud 12 has a lip 16 on a front edge making the opening slightly smaller than a portion of first duct chamber 14 adjacent to lip 16. Intake shroud 12 defines a right bypass inlet vent 18 and a left bypass inlet vent 20 for introducing air into bypass duct assembly 15.

Figure 6:
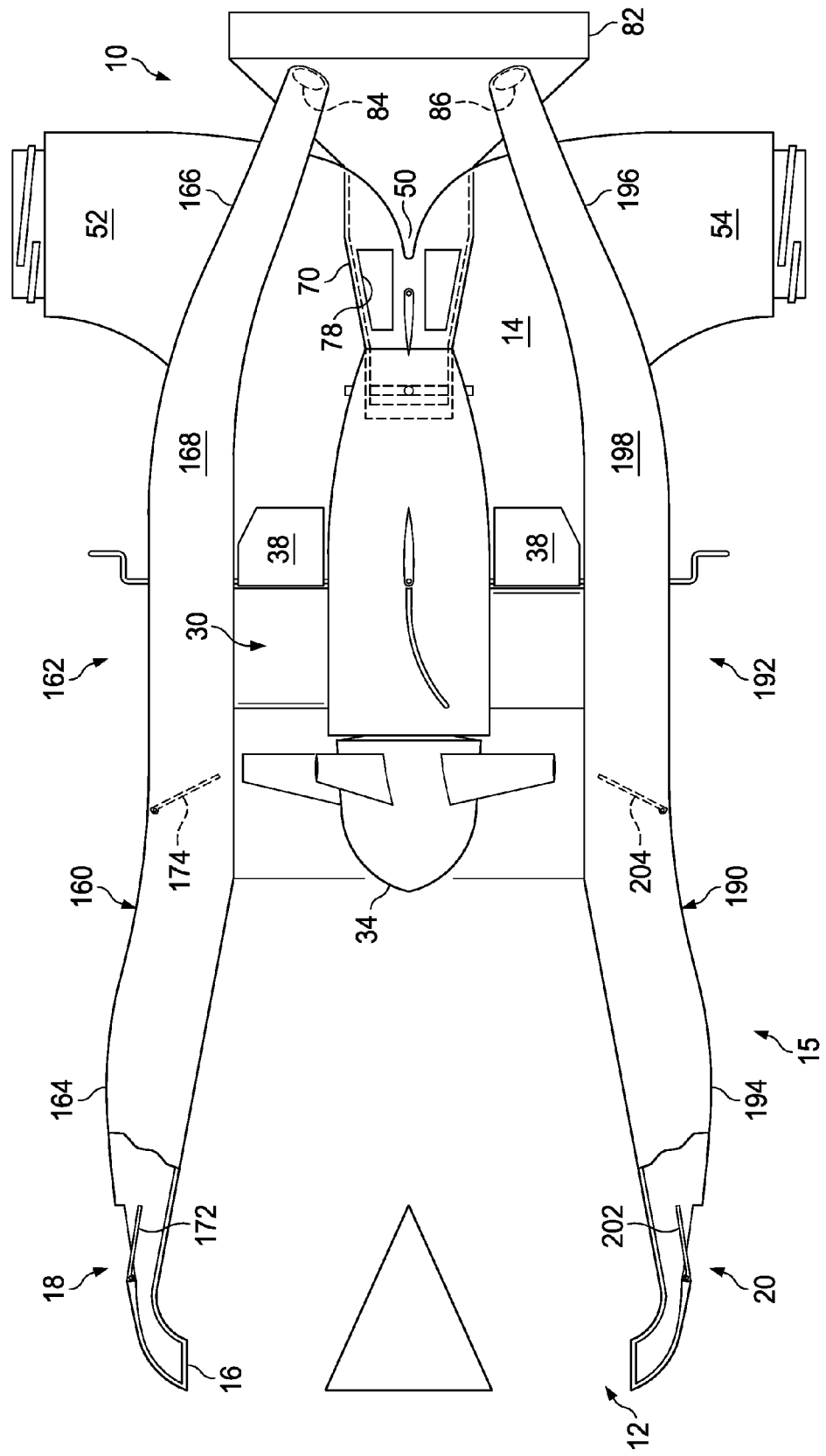
FIG. 6 shows a plan view of a schematic of the bypass duct assembly overlaying a first duct chamber of the casing duct assembly of FIG. 2.
Figure 11:
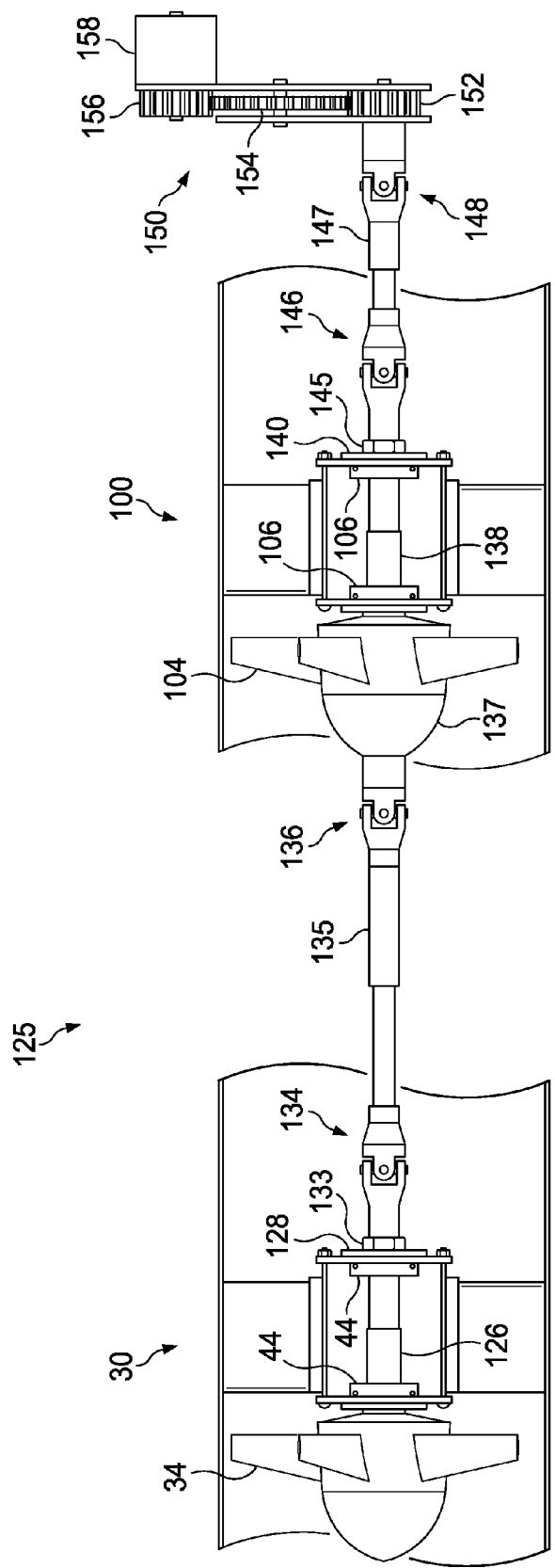
FIG. 11 is a plan view of the main drive assembly located within the casing duct of FIG. 2.
Figure 12:
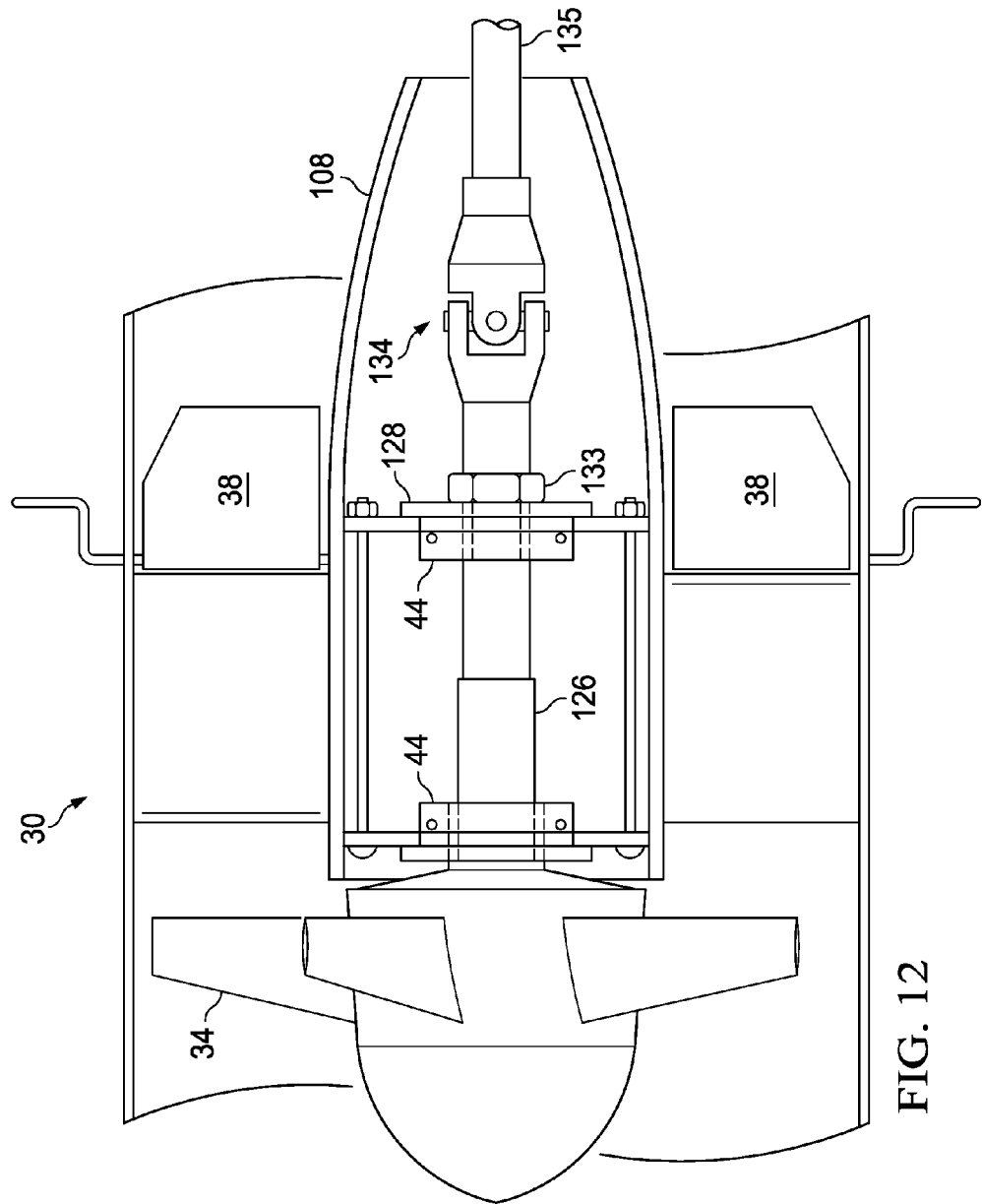
FIG. 12 is a schematic of a ducted fan assembly located within the casing duct of FIG. 2.
Figure 13:
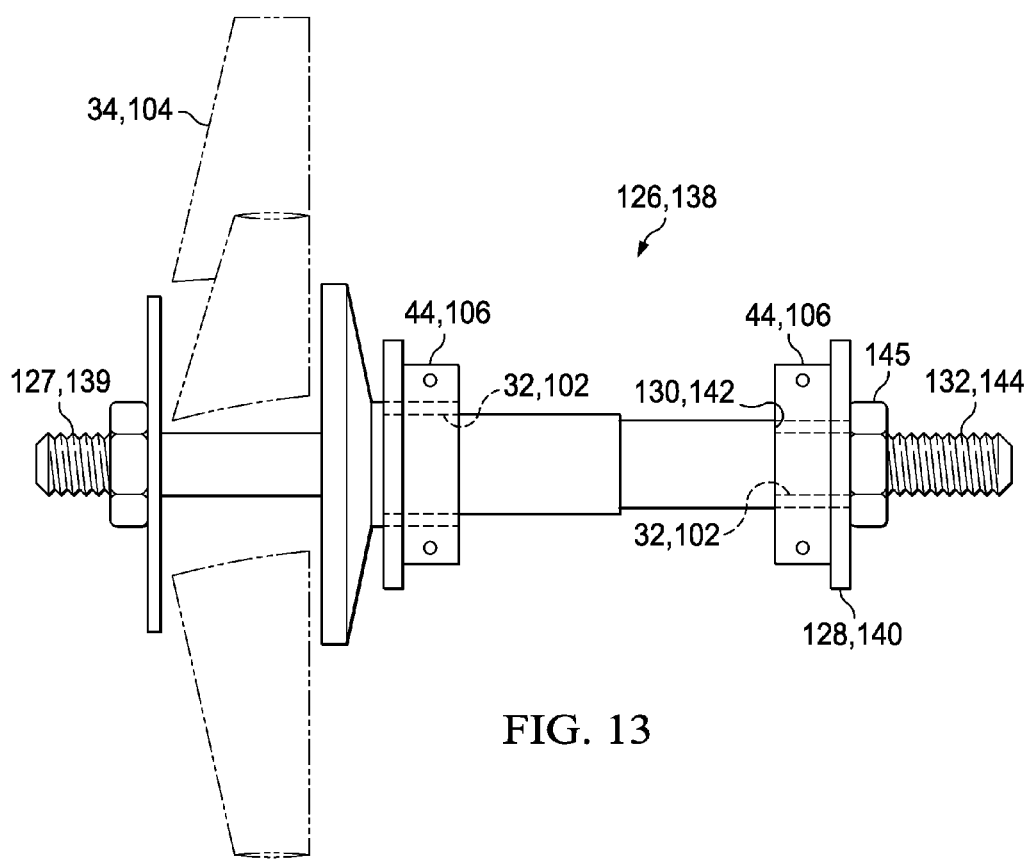
FIG. 13 is a plan view of the drive shaft portion of the main drive assembly of FIG. 11.

A first stator assembly 30 (FIGS. 5, 11) is mounted in first duct chamber 14. First stator assembly 30 defines a first bearing mount 32 (FIGS. 11-13). First fan 34 (FIGS. 5, 6) is located in first stator assembly 30. First duct chamber 14 tapers down close to the size of first fan 34.

A first pressure ring 36 is located upstream from first fan 34. A front hover port 37 (FIG. 3) extends from first pressure ring 36.

Front stator flap 38 (FIG. 5) is mounted on first stator assembly 30. Control ring 41 (FIG. 5) is provided for activating said front stator flap 38. First bearing pair 44 (FIGS. 11, 13) mounted in said first bearing mount 32 of said first stator assembly 30.

Figure 14A:
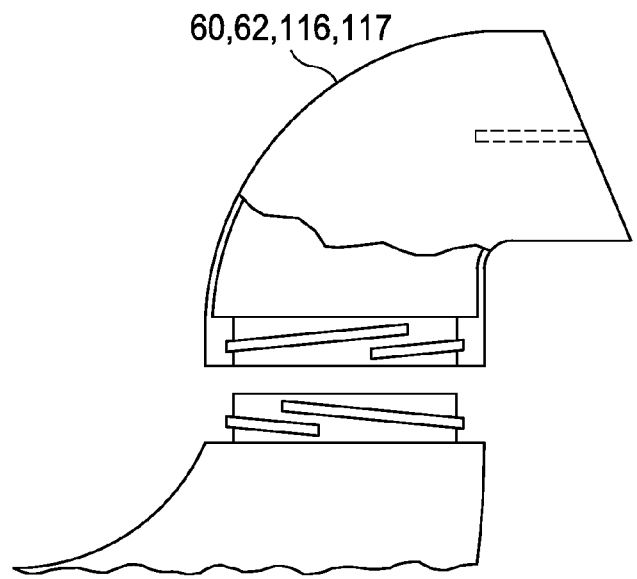
FIG. 14 is a schematic view of a thrust nozzle control assembly for the thrust nozzles of FIG. 1.
Figure 14B:
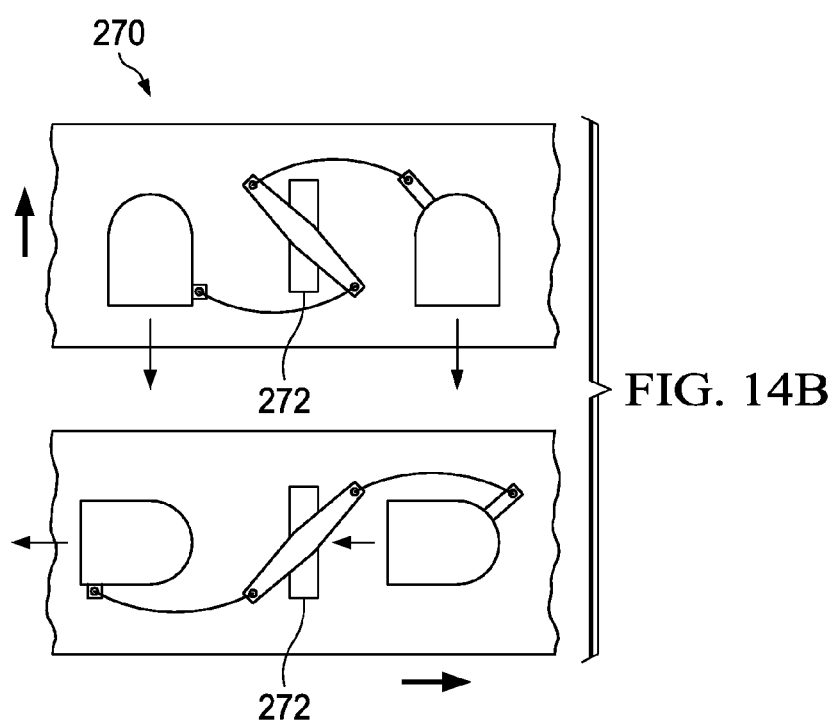
Figure 15A:
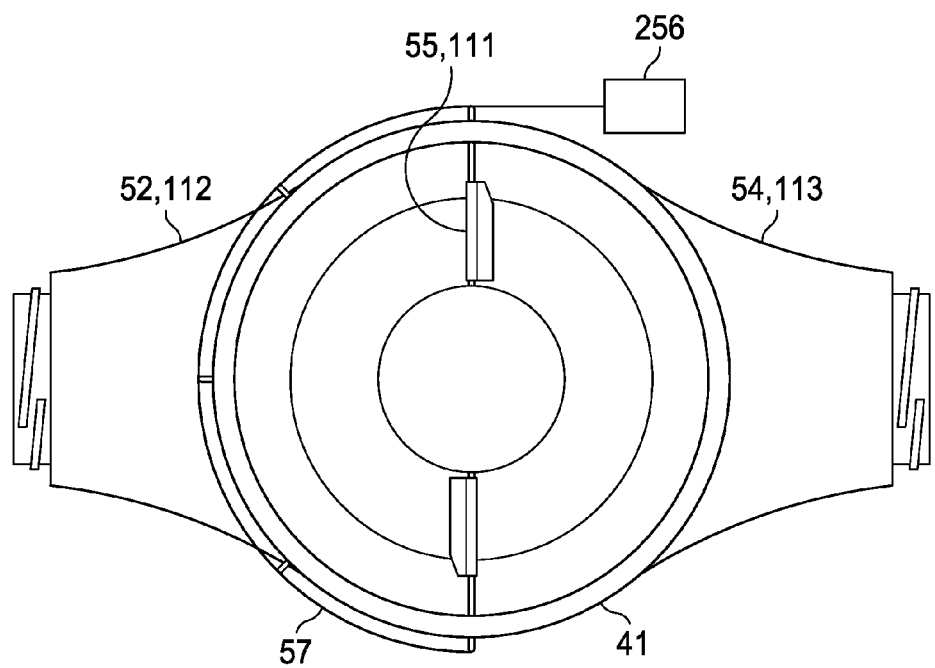
FIG. 15 is a schematic view of a duct flap control assembly for the duct flaps of FIG. 12.
Figure 15B:
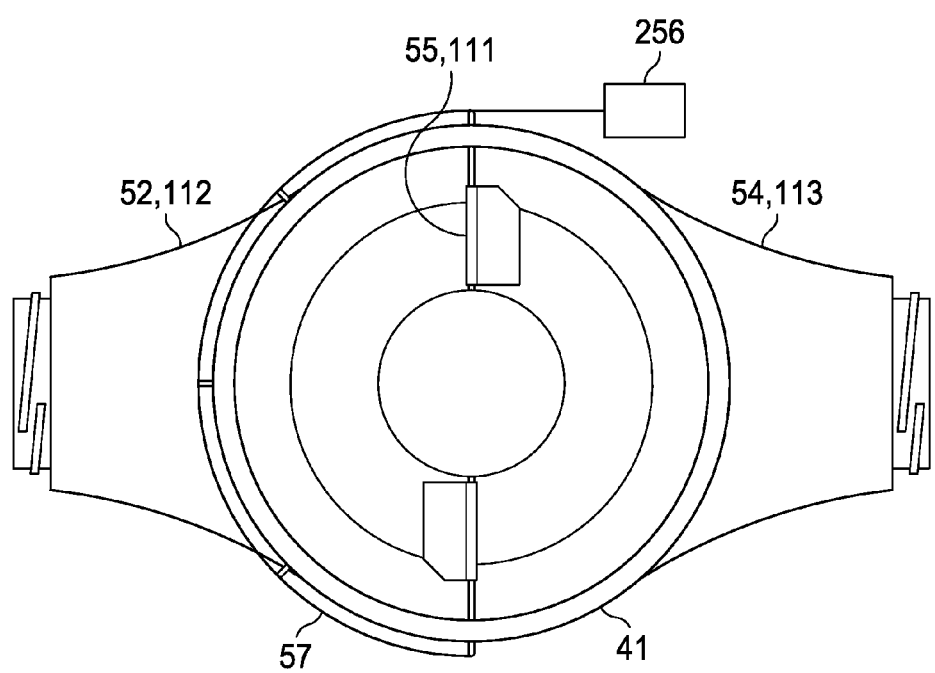
Figure 15C:
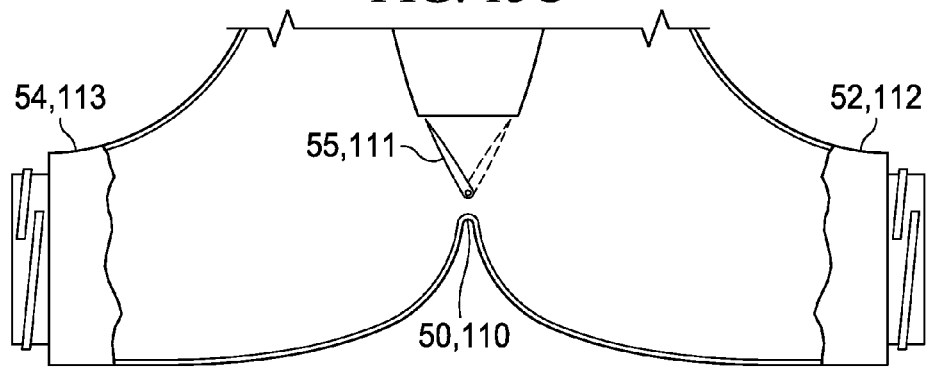
Figure 15D:
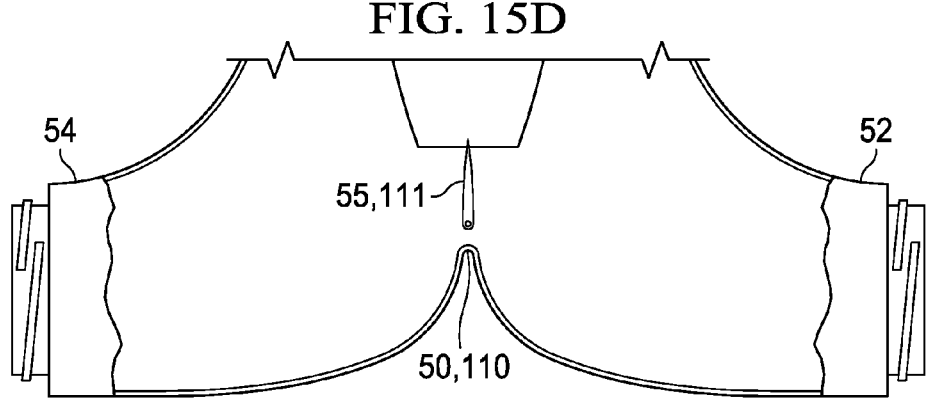
Figure 16:
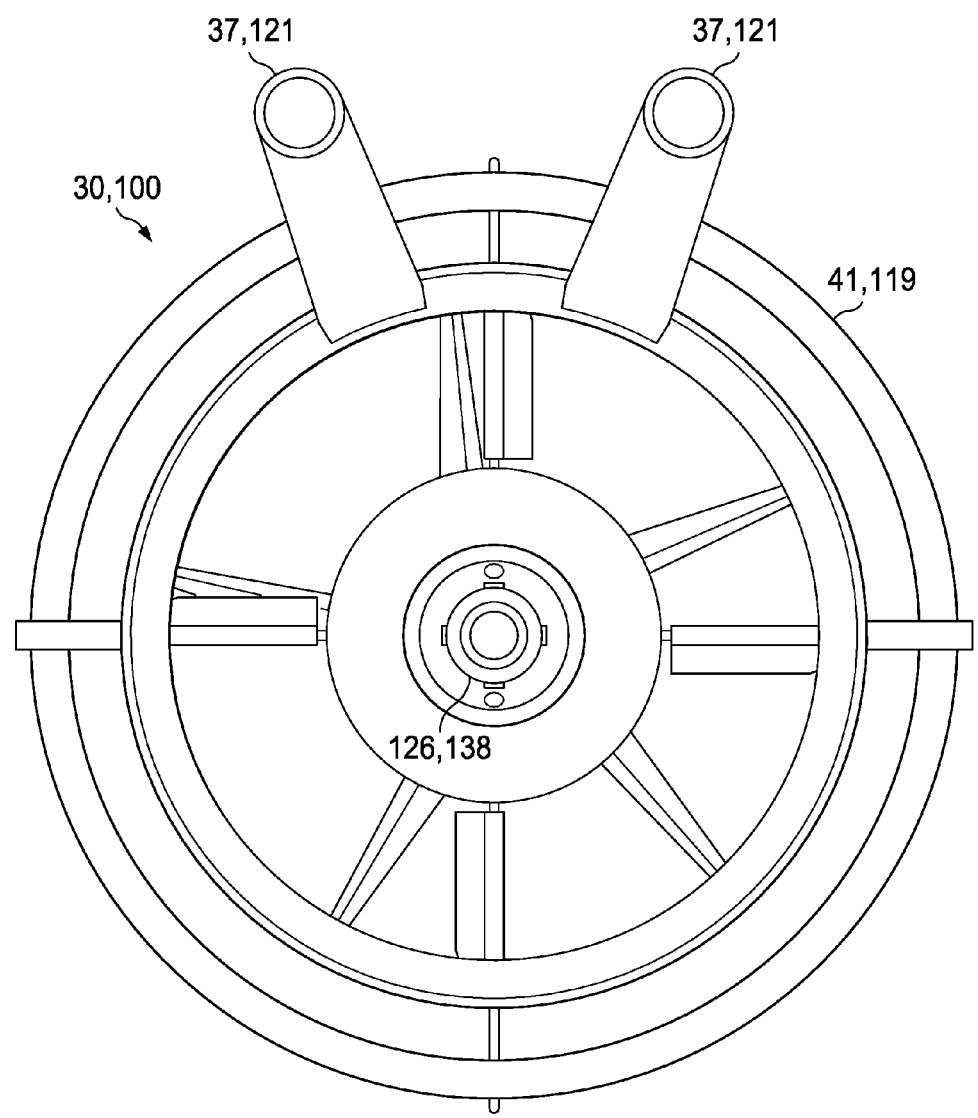
FIG. 16 is an end view of a fan and pressure ring assembly of FIG. 5.
Figure 17:
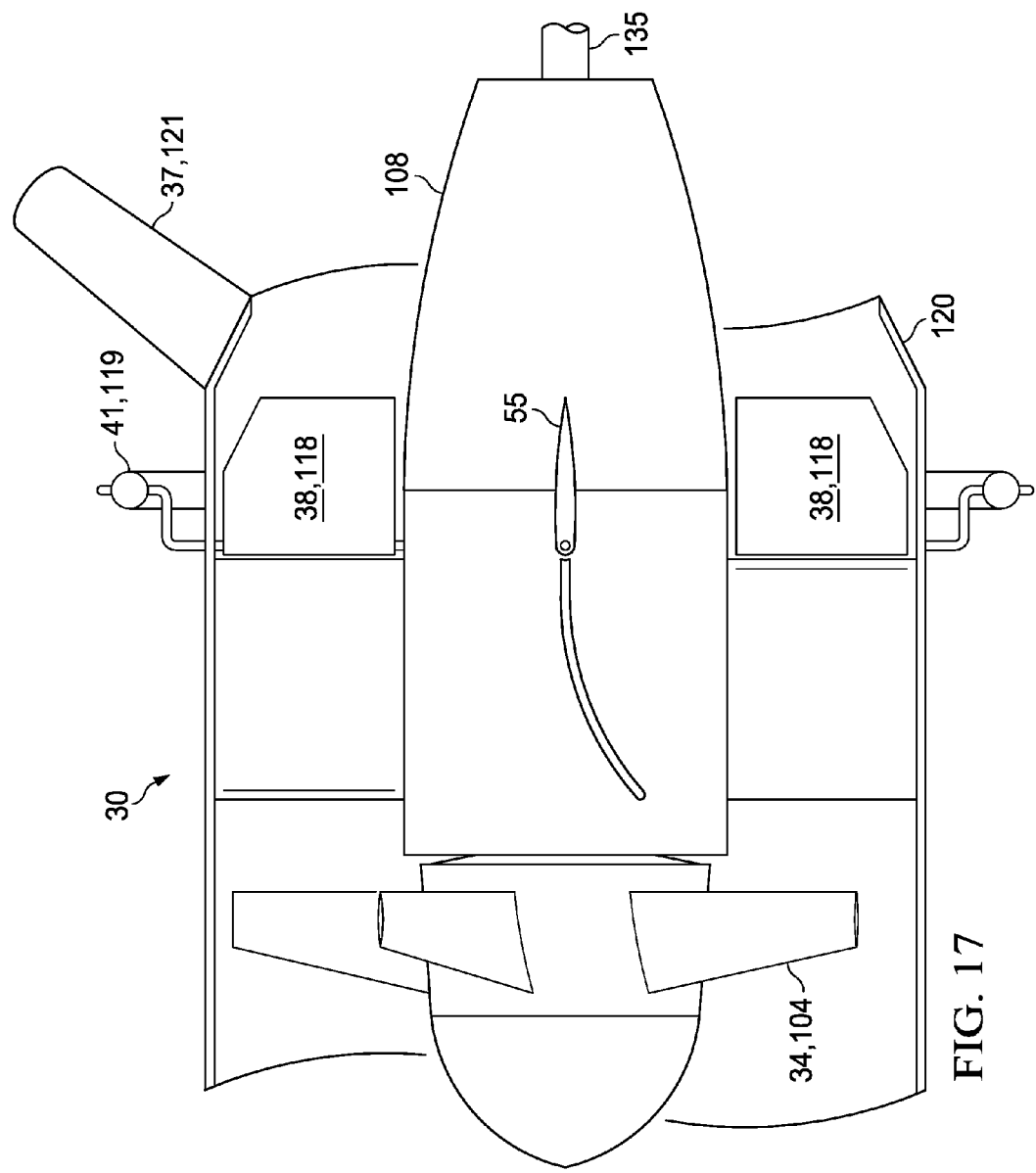
FIG. 17 is a plan view of a fan and a pressure ring assembly of FIG. 16.

A first split 50 (FIG. 4) is formed in first duct chamber 14 where first duct chamber 14 divides into a first right nozzle arm 52 and a first left nozzle arm 54. Duct flap 55 is provided for selectively directing air into one of first right nozzle arm 52 and first left nozzle arm 54 (FIGS. 4-7). Duct flap control ring 57 (FIG. 14) facilitates selective adjustment of duct flaps 55.

First right vortices generator 56 (FIG. 5) is located on an inside surface of first right nozzle arm 52. First left vortices generator 58 (FIG. 5) is located on an inside surface of said first left nozzle arm 54.

First right nozzle 60 (FIGS. 1, 2, 4-7) is rotationally affixed to first right nozzle arm 52. First left nozzle 62 (FIGS. 1, 2, 4-7) is rotationally affixed to first left nozzle arm 54.

Cone valve 70 (FIGS. 5, 6, 9, 10) is affixed to a rear of first duct chamber 14. Cone valve 70 includes bottle assembly 72 for rotating within cone valve casing 74. Bottle assembly 72 defining bottle assembly holes 76 for selective alignment with cone valve casing openings 78 for opening or closing cone valve 70.

Figure 7:
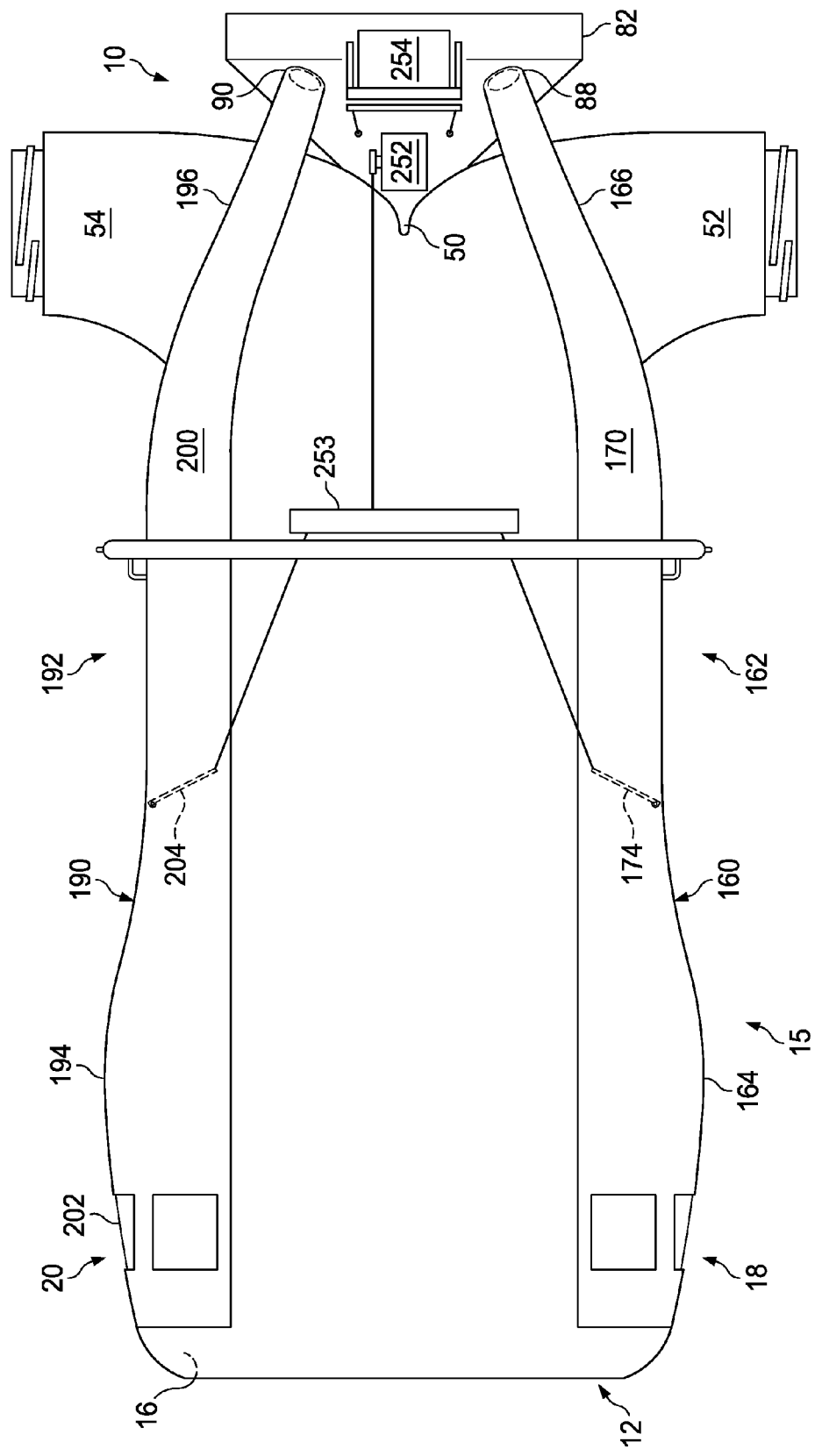
FIG. 7 shows a bottom plan view of a schematic of the bypass duct assembly of FIG. 6.

A second duct chamber 80 (FIGS. 2-5) communicates with a rear of cone valve 70. Second duct chamber 80 defines a transitory diffuser 82 for slowing vented air from first fan 34. Transitory diffuser 82 defines an upper right bypass port 84 (FIGS. 4, 5), an upper left bypass port 86 (FIGS. 3-5), a lower right bypass port 88 (FIG. 7) and a lower left bypass port 90 (FIGS. 3, 7).

Cone valve 70 regulates air pressure and vacuum between said first duct chamber 14 and said second duct chamber 80. A second stator assembly 100 (FIG. 11) is mounted in second duct chamber 80. Second stator assembly 100 defines a second bearing seat 102. Second fan 104 is located within said second stator assembly 100. Second bearing pair 106 is mounted in second bearing seat 102 of second stator assembly 100.

A rear thrust tube 109 extends from a rear of said second nacelle 108.

Second duct chamber 80 defines a rear split 110 where second duct chamber 80 of casing 10 divides into second right nozzle arm 112 (FIGS. 1, 2, 4, 5) and second left nozzle arm 113. Rear duct flap 111 is pivotally affixed adjacent to rear split 110 (FIGS. 4, 5). Second right vortices generator 114 (FIG. 5) and second left vortices generator 115 (FIG. 5) are located within second nozzle arms 112, 113.

Second right nozzle 116 (FIGS. 1, 2, 4, 5,) is rotationally affixed to second right nozzle arm 112 (FIGS. 4, 5). Second left nozzle 117 is rotationally affixed to second left nozzle arm 113 (FIGS. 4, 5).

Rear stator flap 118 (FIG. 5) is mounted on said second nacelle 108. Control ring 119 is provided for activating rear stator flap 118. Rear pressure ring 120 is located a rear end of rear thrust tube 108. Rear pressure ring 120 defines a rear hover port 121 (FIG. 3).

Main drive assembly 125 (FIG. 11) includes a first fan shaft 126 (FIGS. 11-13) mounted in first stator assembly 30. First fan shaft 126 defines threaded hub mount 127. First fan 34 is affixed to threaded hub mount 127. First hub mounting plate 128 is located on first fan shaft 126. First hub mounting plate 128 is adjacent to a rear of first stator assembly 30. First fan shaft 126 defining a first front bearing seat 32 adjacent a rear of first hub mounting plate 128 for receiving one of first pair of bearings 44. First fan shaft 126 defines a rear bearing inner collar nub 130 adjacent to first rear bearing seat 32 for receiving a second bearing of first pair of bearings 44. First fan shaft 126 further defines rear bearing retaining nut threading 132 for receiving rear bearing retaining nut 133.

First u-joint 134 is affixed to a rear of first fan shaft 126. First telescoping drive shaft 135 is affixed to a rear of first u-joint 134. Second u-joint 136 is affixed to a rear of first telescoping drive shaft 135. Fan connector 137 is affixed to a rear of second u-joint 136. Second fan 104 is affixed to a rear of fan connector 137.

Second fan shaft 138 (FIG. 11) passes through second stator assembly 100. Second fan shaft 138 defines a threaded hub mount 139. Second fan 104 is affixed to threaded hub mount 139. Second hub mounting plate 140 is located on second fan shaft 138. Second hub mounting plate 140 is adjacent to a rear of second stator assembly 100. Second fan shaft 138 defines a second bearing seat 102 adjacent to a rear of second hub mounting plate 140 for receiving one of the bearings of second pair of bearings 106. Second fan shaft 138 defines a second rear bearing inner collar nub 142 adjacent to second rear bearing seat 102 for receiving a second bearing of the second pair of bearings 106. Second fan shaft 138 defines rear bearing retaining nut threading 144 for receiving rear bearing retaining nut 145.

Third u-joint 146 is affixed to a rear of second fan shaft 138. Second telescoping drive shaft 147 is affixed to a rear of third u-joint 146. Fourth u-joint 148 is affixed to a rear of second telescoping drive shaft 147.

Transmission 150 (FIG. 11) is mounted reward of second fan 104. Transmission 150 includes drive gear 152, drift gear 154 and output gear 156. Drive gear 152 is affixed to fourth u-joint 148 of main drive assembly 125.

Bearing assembly 157 is provided for securing said main drive assembly 125 within said casing 10.

Figure 21:
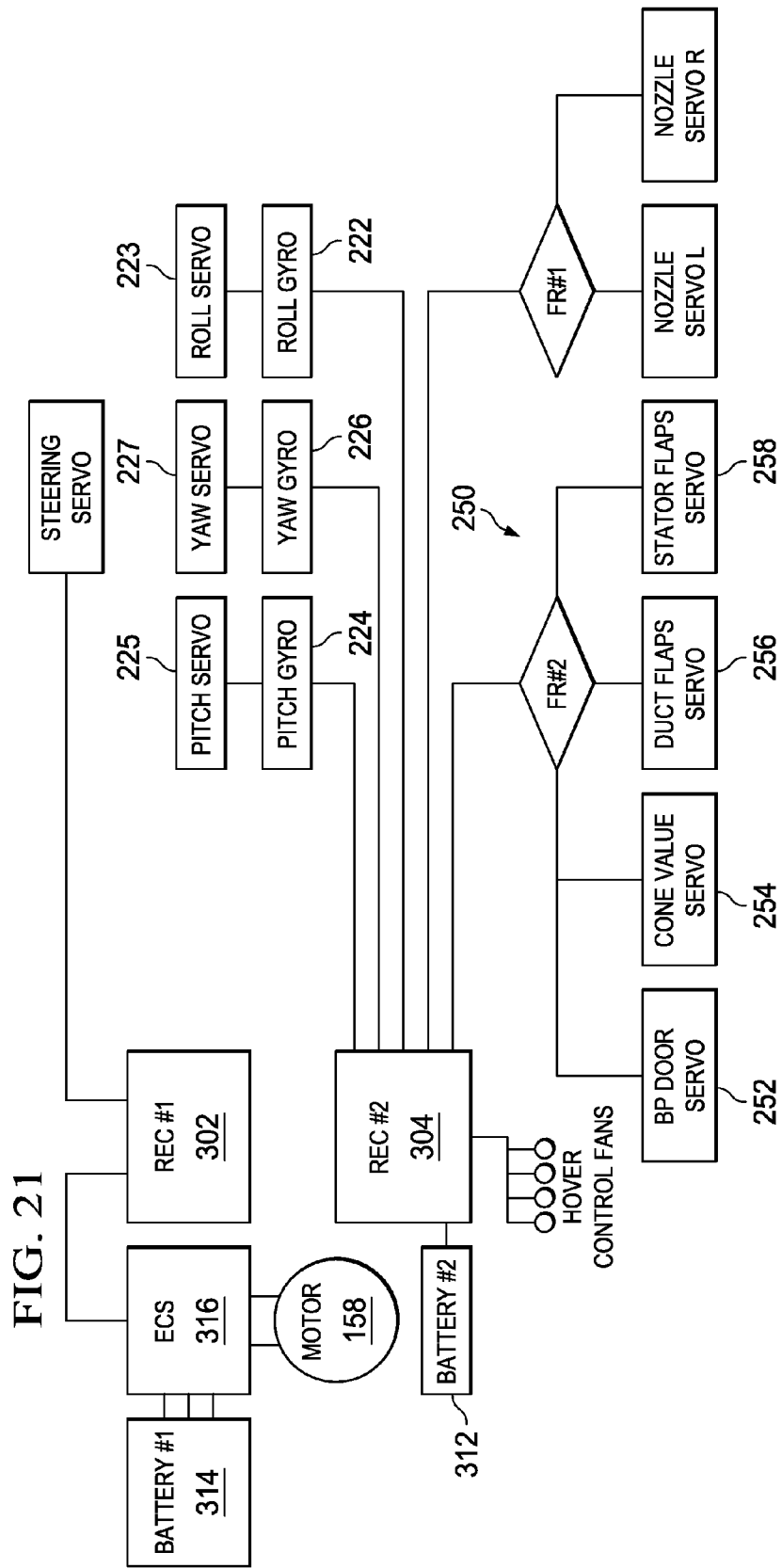
FIG. 21 is a schematic of the electric sub system of FIG. 2.

Motor 158 (FIGS. 2, 11, 21) has a motor shaft 159 that communicates with drive gear 152 for rotating main drive assembly 125.

Right bypass duct 160 (FIGS. 4, 6, 7) of bypass duct assembly 15 has a right split section 162. Right forward unitary section 164 communicates with and receives air from said right bypass inlet vent 18. At right split section 162, right forward unitary section 164 divides into right rearward section 166 having an upper right small bypass duct 168 that passes over first right nozzle arm 52 and a lower right small bypass duct 170 that passes under first right nozzle arm 52. Upper right small bypass duct 168 engages with upper right bypass port 84 of transitory diffuser 82. Lower right small bypass duct 170 engages lower right bypass port 88 of transitory diffuser 82.

Right bypass inlet regulator door 172 is located adjacent to right bypass inlet vent 18 for controlling flow into right forward unitary section 164 of right bypass duct 160. Right bypass duct regulator door 174 is located adjacent to right split section 162 of right bypass duct 160.

Left bypass duct 190 (FIGS. 3, 4, 6, 7) has left split section 192. At left split section 192, left forward unitary section 194 is divided into an upper left small bypass duct 198 and lower left small bypass duct 200. Left forward unitary section 194 communicates with and receives air from said left bypass inlet vent 20. Left rearward section 196 begins at left split section 192 and includes upper left small bypass duct 198 that passes over first left nozzle arm 54 and lower left small bypass duct 200 that passes under first left nozzle arm 54. Upper left small bypass duct 198 engages with upper left bypass port 86 of transitory diffuser 82. Lower left small bypass duct 200 engages lower left bypass port 90 of transitory diffuser 82.

Left bypass inlet regulator door 202 (FIG. 6) is adjacent to left bypass inlet vent 20. Left bypass duct regulator door 204 (FIG. 6) is adjacent to left split section 192 of left bypass duct 190.

Right bypass inlet regulator door 172, left bypass inlet regulator door 202, right bypass duct regulator door 174 and left bypass duct regulator door 204 are provided for regulating an air supply for second fan 104.

Vortices generators 210 (FIG. 3) are located in an inside of a bend of upper right small bypass duct 168, lower right small bypass duct 170, upper left small bypass duct 198 and lower left small bypass duct 200, adjacent to said first split 50.

Figure 18:
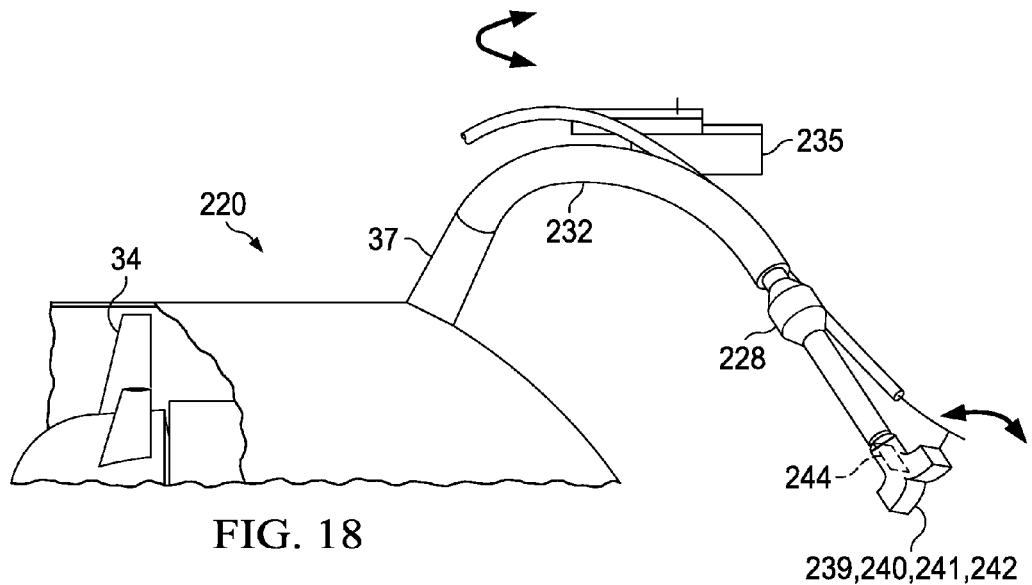
FIG. 18 is a schematic view of the puffer controls of FIG. 1.
Figure 20:
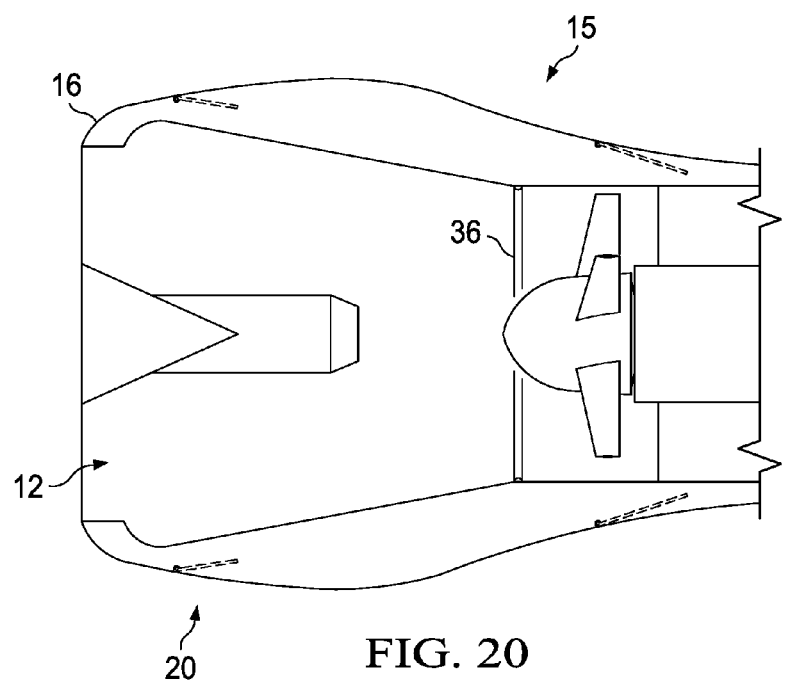
FIG. 20 is a plan view of the intake shroud of FIG. 4.

A hover flight control system 220 (FIG. 18) has first or roll gyro 222 (FIG. 21) mounted in the wing assembly. Second or pitch gyro 224 is mounted starboard in the internal bay. Third or yaw gyro 226 is mounted port side in an internal bay in fuselage 2.

Hover flight control system 220 includes right wing tip tube 230 (FIG. 1) in communication with said first or roll gyro 222 and roll servo 223. Left wing tip tube 232 (FIG. 1) communicates with first or roll gyro 222 and roll servo 223. Hover controls within respective tubes are connected to their respective servo arms by a pushrod.

Hover flight control system 220 further includes right tail tube 234 (FIG. 1). Right tail tube 234 communicates with second or pitch gyro 224 and pitch servo 225 to make up the pitch aspect of hover flight control system 220. Left tail tube 236 (FIG. 1) communicates with third or yaw gyro 226 and yaw servo 227 to make up the yaw aspect of hover flight control system 220.

Reaction control or puffer servo 222 (FIGS. 2 and 18) for roll orientation is located between the wings.

Micro fan 228 (FIG. 18) is mounted in each of connection tubes 230, 232, 234, 236 that extend from front hover ports 37 and rear hover ports 121 in the compressor to a corresponding hover control vent, i.e., to right wing hover control vent 239, left wing hover control vent 240, right tail hover control vent 241, or left tail hover control vent 242.

Centrally pivoting puffer flap 244 (FIG. 18) is provided within each of right wing hover control vent 239, left wing hover control vent 240, right tail hover control vent 241, and left tail hover control vent 242.

Cone valve 70, right bypass inlet regulator door 172, left bypass inlet regulator door 202, right bypass duct regulator door 174 and left bypass duct regulator door 204 are adjusted to regulate air entering said second fan and can be calibrated to temperature, barometric pressure and humidity. The engine is designed vary the volume of ram effect in second fan 104 to increase overall thrust development and air mass pressure. The compressor can be configured by an altimeter to automatically adjust the performance for a given flight altitude. Altimeters are set to temperature, humidity and barometric pressure to account for sea level. These factors change with altitude. By providing adjustments, engine of the invention can compensate for changing conditions maintain optimal performance.

First or roll gyro 222, second or pitch gyro 224, and third or yaw gyro 226 control the aircraft in hover by detecting any imbalance and compensating the proper counter action to maintain the aircraft in a flat and level orientation. Gyros 222, 224, and 226 communicate roll servo 223, pitch servo 225 and yaw servo 227.

A compressor airflow control 250 (FIG. 21) includes first or bypass duct servo 252, a second or cone valve servo 254, a third or duct flap servo 256, and a fourth or stator flap servo 258.

Figure 19A:
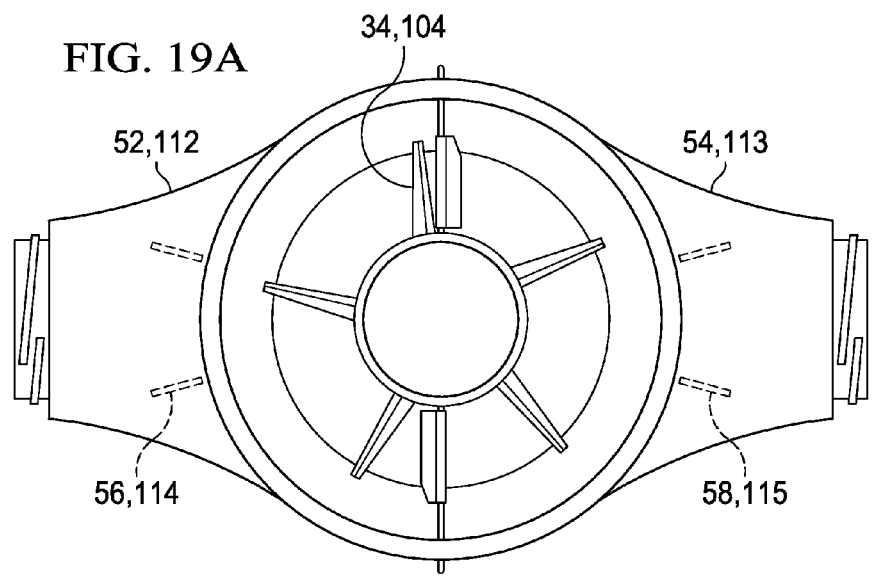
FIG. 19 is a plan view of a vortices generator of FIG. 5.
Figure 19B:
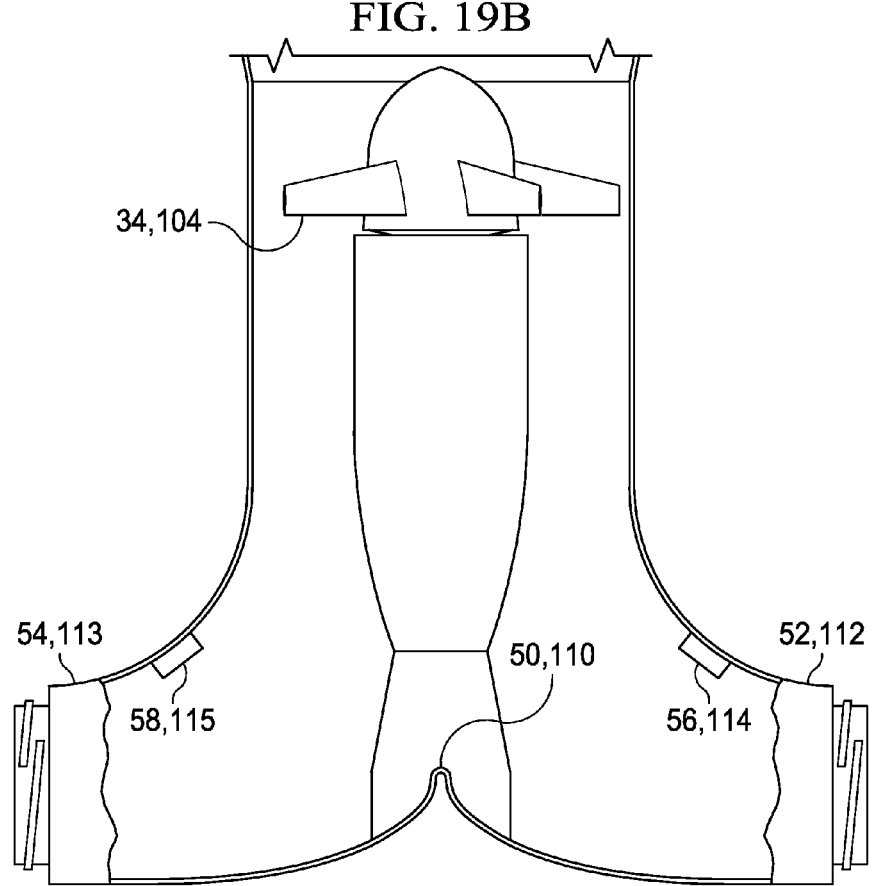

First or bypass duct servo 252 is provided for controlling right bypass inlet regulator door 172 (FIG. 6) and left bypass inlet regulator door 202. Second or cone valve servo 254 is provided for controlling the cone valve 70 (FIGS. 1, 19). Third or duct flap servo 256 is provided for controlling said rear stator flaps 118 (FIG. 5) in said rear thrust tube 108. Fourth or stator flap servo 258 is provided for controlling said front stator flap 38 (FIG. 5.

First servo 252, said second servo 254, said third servo 256, and said fourth servo 258 are bused together and linked by one channel on a receiver for facilitating control of said servos 252, 254, 256, and 258 by a single input.

Nozzle control system 270 (FIG. 14) includes nozzle rotation servo 272. Nozzle rotation servo 272 (FIG. 14) is preferably mounted between first nozzle arms 52, 54 and second nozzle arms 112, 113. Nozzle rotation servo 272 is provided for selectively rotating nozzles 60, 62, 116, 117 from a vertical position to a rearward position of preferably up to 15 degrees, although other ranges of rotation may also be permitted, e.g., ranges of vertical to 20 degrees offset, or some offset of less than 20 degrees. Alternatively, the nozzles 60, 62, 116, 117 may be rotatable for some amount forward of vertical, e.g., similar to the above described rearward rotation.

Dual receiver radio control system 300 (FIG. 21) includes a first receiver 302 and a second receiver 304.

Motor bay 311 (FIG. 2) located at a rear of fuselage 2 and includes steering power supply 312, motor battery 314, and ECS 316.

Landing gear (not shown) preferably includes a steerable front wheel and wing wheels.

Selected components of the aircraft of the invention will be discussed in greater detail, below.

I. Bypass Duct Assembly

Bypass Duct Assembly

Referring now primarily to FIGS. 3-8, shown is a bypass duct assembly 15. Bypass duct assembly 15 has an inlet at bypass inlet vents 18 and 20.

Referring now primarily to FIGS. 3-8, a depiction of bypass duct assembly 15 of the present disclosure is shown. Starting at the left side of the figures, intake shroud 12 is located in the drawings. Bypass ducts 160, 190 run a length of casing 10 from intake shroud 12 along each side of casing 10. Bypass ducts 160, 190 then split, with a portion, i.e., upper small bypass ducts 168, 198, that run over nozzle arms 52, 54 and connect to transitory diffuser 82. Bypass ducts 160, 190 are hollow and allow air to be fed to second fan 104 in second duct chamber 80. In one embodiment, bypass inlet vents 18, 20 are located on the outside of airplane fuselage 2 to mimic external suction doors on a Harrier Jump Jet. To achieve this, bypass inlet vents 18, 20 have small spring loaded bypass inlet regulator doors 172, 202 adjacent to bypass inlet vents 18, 20. Bypass inlet vents 18, 20 preferably span from top to bottom at a front edge of intake shroud 12.

Air is drawn into bypass ducts 160, 190 by suction created by second fan 104. As the air mass travels through bypass ducts 160, 190, the air is compressed by the shape of bypass ducts 160, 190, which decreases in cross-sectional area from front to back.

Bypass ducts 160, 190 are designed with adjustable bypass duct regulator doors 174, 204 to regulate a volume of air entering the system. After the forward unitary sections 164, 194 of bypass ducts 160, 190 the air stream contacts bypass inlet regulator doors 172, 202. Then, each of bypass ducts 160 and 190 split the air mass into two smaller flows, i.e., air flow through upper left small bypass duct 198, through upper right small bypass duct 168, through lower left small bypass duct 200, and through lower right small bypass duct 170. The split occurs at right split section 162 and left split section 192.

The small portion of small bypass ducts 198, 168, 200 and 170 are connected to second duct chamber 80 and direct the air mass into transitory diffuser 82 through bypass ports 84, 86, 88 and 90. Bypass ducts 160, 190 and transitory diffuser 82 are essentially connected together as one long duct.

Referring now to FIG. 7, a depiction of a bottom of bypass duct assembly 15 of the present invention is shown. Bypass duct regulator doors 174, 204 are operated by bypass duct door servo 252. Bypass duct regulator doors 174, 204 are attached to an actuator arm that extends outside casing 10. The actuator arms are connected by a linkage to slide plate 253. Slide plate 253 connects left and right linkages, one for each side to left and right bypass duct regulator doors 174, 204. Slide plate 253 insures equal movement of both bypass duct regulator doors 174, 204. Slide plate 253 is connected to an arm of bypass duct door servo 252 via a slide plate linkage. Bypass duct door servo 252 is preferably mounted in a center portion of casing 10. The slide plate linkage is offset from the center of casing 10 to accommodate the arm of bypass duct door servo 252.

Bypass duct regulator doors 174, 204, cone valve 70, front stator flaps 38 and duct flap 55 are linked together electronically. In a preferred embodiment, they are wired to each other and set to one radio channel operated by a twist knob on a transmitter that communicates with ECS 316. A twist knob allows each of bypass duct regulator doors 174, 204, cone valve 70, front stator flaps 38 and duct flap 55 to be opened or closed incrementally in synchronization to one another. By incrementally adjusting the various flaps and valves of the subsystem the compressor can be calibrated for maximum pressure, thrust development and optimal efficiency of operation.

Bypass ducts 160, 190 vent air to second fan 104. Bypass duct assembly 15 includes a set of ducts that connect second fan 104 to an external air source separate from the main inlet 191, which passes over first fan 34. Bypass ducts 160, 190 incorporate a transom type bypass inlet regulator door 172, 202 at the front to regulate air flow to second fan 104. The bypass airflow is divided into four chamber inlets, i.e., ports 84, 86, 88, 90 in front of second fan 104, for providing steady air supply balanced with the expanding thrust air mass from first fan 34 through cone valve 70 into transitory diffuser 82.

Each bypass duct 160, 190 is uniquely shaped. The front allows for large amounts of air to be drawn into bypass inlet vents 18, 20 regulated by bypass inlet regulator doors 172, 202, for funneling the air mass into a tapering duct and into second fan 104. Bypass duct assembly 15 is preferably cast from one mold and incorporates curves and closures to pressurize assembly 15.

Bypass duct assembly 15 is configured as two sections. The first section includes the bypass inlet vents 18, 20 and bypass inlet regulator doors 172, 202. The second section is bypass ducts 160, 190. The front of bypass duct assembly 15 incorporates the threshold of bypass inlet regulator doors 172, 202. The center section of bypass duct assembly 15 is shaped for facilitating air flow compression. The rear section of bypass duct assembly 15 accommodates the curves and ducting to bridge casing 10 and attach bypass ducts 160, 190, i.e., upper left small bypass duct 198, upper right small bypass duct 168 lower left small bypass duct 200, and lower right small bypass duct 170, to transitory diffuser 82. Bypass ducts 160, 190 induce air flow rotation with a slight venturi for a dedicated vacuum.

Bypass duct assembly 15 includes five sections sealed into one tube or duct. The five sections include bypass duct regulator doors 174, 204, (left bypass duct regulator door 204 visible in FIG. 8), main inlet 191, split sections 162, 192 and the small bypass ducts 168, 170, 198, 200 are all incorporated to make bypass ducts 160, 190. The bypass duct assembly 15 is designed to regulate the air supply for second fan 104.

Figure 8:
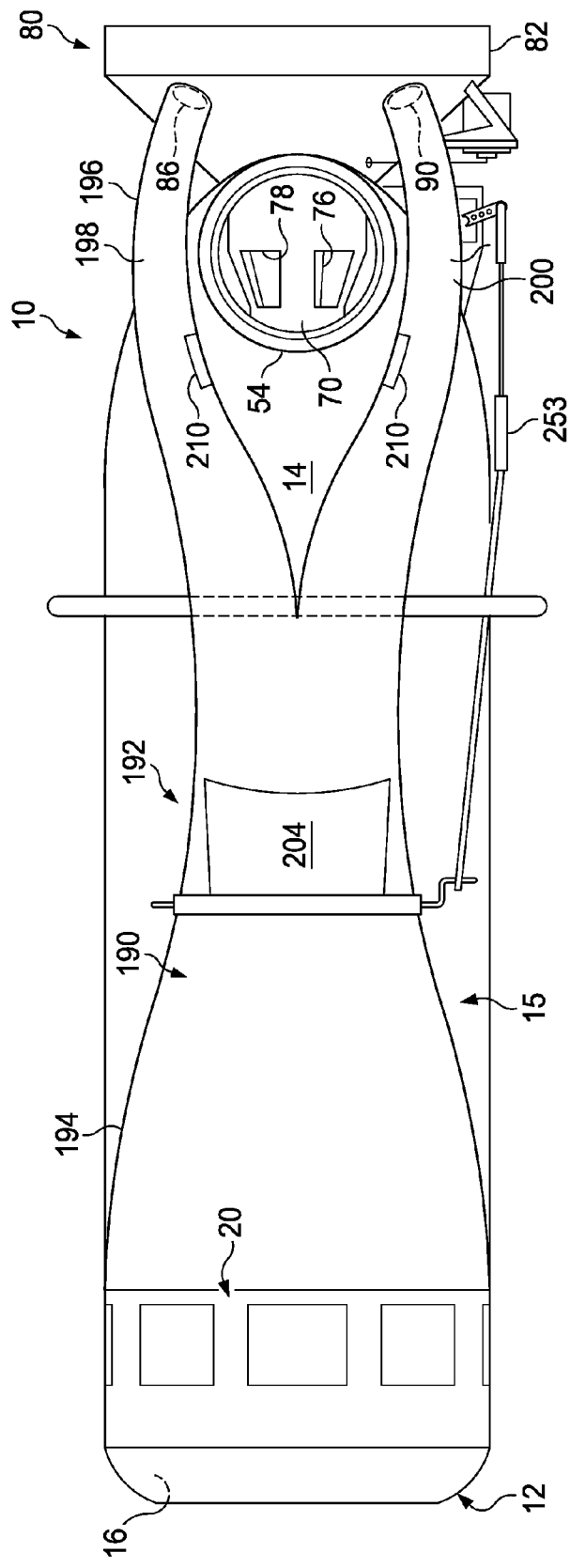
FIG. 8 shows a side perspective view of the bypass duct assembly of FIG. 6.

As can be seen from the side perspective shown in FIGS. 3 and 8, bypass duct regulator doors 174, 204 are operated by first servo 252. First servo 252 is connected to bypass duct regulator doors 174, 204 by linkages attached to an arm of servo 252. A wire rod preferably connects the arm of servo 252 to slide plate 253 (FIGS. 7, 8). Slide plate 253 has two push rods that project through the wall of bypass duct assembly 15 for communicating with first servo 252, one for each of doors 172, 202 on each side. The push rods are connected to doors 172, 202 by a small hole in push rod itself.

Referring now to FIG. 9, cone valve 70 operates in a similar fashion as bypass inlet regulator doors 172, 202. As it appears in FIG. 9, cone valve 70 includes bottle assembly 72, which is rotated causing cone valve 70 to selectively align or offset bottle assembly holes 76 within the cone valve casing openings 78. To accomplish this, second servo 254 is orientated underneath transitory diffuser 82 at a location that aligns second servo 254 with cone valve 70. A wire push rod is connected to an arm of second servo 254, which is preferably of a length that matches a circumference of bottle assembly 72. Push rods preferably projects through the casing of transitory diffuser 82 using two small holes. A push rod passes into second duct chamber 80 just upstream of second fan 104. A push rod connects to cone valve bottle assembly 72 via arms projecting from bottle assembly 72. The arms preferably have holes in them to accommodate the rods. The rods are preferably bent into shape and account for the twisting action by being a bit longer to bridge the extra distance caused by rotation of bottle assembly 72.

II. Drive Train

Drive Shaft Assembly

Main drive assembly 125 is made up of multiple pieces. First fan shaft 126 and second fan shaft 138 are preferably constructed of a single milled piece. Shafts 126, 138 are preferably milled from solid steel. Referring to FIG. 13, features will be discussed beginning from the left of the Figure.

Threads 127, 139 are preferably reverse threads for receiving a fan rotor lock down nut. The fan rotor lock down nut attaches to fan shaft 126, 138 and secures fans 34, 104 in place between a lock down washer and mounting plate 128, 140. Adjacent to a back side of mounting plate 128, 140 is a bearing seat 32, 102 for receiving on of bearings 44, 106. The bearing seat facilitates a connection between drive shaft fan shaft 126, 138 and one of bearings 44, 106. A center section of fan shafts 126, 138 is preferably milled in two different sizes. The front is milled to a larger size to accommodate a slightly larger one of bearings 44, 106. The rear end of the center section of fan shaft 126, 138 is milled to a smaller size to connect to a smaller one of bearings 44, 106. Rear bearing seat 32, 102 has a bearing inner collar nub 130, 142. Beyond rear bearing seat 32 102, fan shaft 126, 138 has regular threads 132, 144 for receiving rear bearing retaining nut 133, 145. Rear bearing retaining nut 133, 145 tightens fan shaft 126, 138 down against the bearings 44, 106 retained by the flairs on bearings 44, 106, wherein bearings 44, 106 are retained within nacelle bulwark walls, i.e., walls of casing 10.

Nuts 133, 145 and fan rotor lock down nut create compression forces inwardly along fan shafts 126, 138. Threads 132, 144 function as a mounting location for a u-joint, such as first u-joint 134 on rear bearing retaining nut threads 132 and third u-joint 146 on second rear bearing nut retaining nut threads 144. Threads 132, 144 preferably define two slightly flat spots to accommodate Allen wrench lock down set screws in the collar of u-joints 134 and 146.

a) Drive Shaft Connector

Main drive assembly 125 powers first fan 34 and second fan 104 within casing 10. An important piece of the drive train is fan connector 137 (FIG. 11). Fan connecter 137 joins first fan 34 and second fan 104 together to achieve a dynamic turbine-like performance. Fan connector 137 threads into second fan 104. The other end of fan connector 137 is milled to accommodate second u-joint 136. In one embodiment, fan connector 137 connects second fan 104 to first fan 34 via a double ended telescoping u-joint. The fan connector 137 may incorporate a hub threading and a u-joint mount as one piece bridging two sections of main drive assembly 125 into one.

b) Drive Shaft; Main Drive Assembly

Main drive assembly 125 (FIG. 11) consists of two fan hub connections, two pairs of bearings 44, 106, two telescoping u-joint assemblies that include components 134, 135, 136, 146, 147, and 148 and one fan connector 137. Each component of main drive assembly 125 is integrated to provide stable and balanced rotational performance with minimal resistance. Modular and compact, main drive assembly 125 transmits energy from motor 158 directly to fans 34, 104. Spanning the distance between first fan 34 and second fan 104 is a portion of main drive assembly 125 that includes two u-joint assemblies wherein the first u-joint assembly is made up of first u-joint 134, first telescoping drive shaft 135 and second u-joint 136. The second u-joint assembly is made up of third u-joint 146, second telescoping drive shaft 147 and fourth u-joint 148. Transmission 150 is connected to the fans 34, 104 by a similar u-joint configuration, i.e., fourth u-joint 148, on an output shaft of transmission 150. The u-joint sections are split to accommodate different lengths and insert into one another for optimal fit.

c) Bearing Assembly

The bearing assembly 157 holds the drive shaft in place within the duct nacelle, i.e., within casing 10. Bearings 44, 106 center fans 34, 104 inside the duct chamber 14, 80, respectively and provide smooth free floating operation at high speed. Bearings 44, 106 are preferably rated at 100,000 rpm.

d) Fan Adaptor Plate

The fan adaptor plate comprises the support within the nacelle. The plate has a place for receiving bearing 44, 106. Bearings 44, 106 support main drive assembly 125. Bearing assembly 157 provides a rigid area to brace the nacelle within the casing. Fan shafts 126, 138 are designed to fit snugly into the centers of bearings 44, 106. Once bearings 44, 106 are sealed in place, the u-joints 134 and 146 may be attached.

e) Fan Drive Shaft

Each fan 34, 104 is mounted to main drive assembly 125 that rides on bearings 44, 106 at the center of the nacelle. Preferred fan shafts 126, 138 are custom milled to exact specifications for this purpose. One end of fan shafts 126, 138 holds a respective hub of first fan 34 and second fan 104 while the other end the other accommodates a u-joint segment, e.g. u-joints 134 and 146. The design allows for smooth rotational high speed performance. The main drive assembly 125 connects fan 34, 104 to stator casings 30, 100.

f) Transmission Assembly

To power fans 34, 104, motor 158 is used to provide steady and reliable operation. Motor 158 is connected to the main drive assembly by transmission 150. Transmission 150 gears up the output from motor 158 and compensates for backlash and torque. Transmission 150 is preferably mounted to an external portion of second duct chamber 80 and connected to main drive assembly 125 by fourth u-joint 148. Motor 158 is preferably mounted to transmission 150 as one part for easy maintenance and removal. Transmission 150 is preferably mounted to the compressor by screws and a bracket on second duct chamber 80.

a) Drive Shaft

A preferred embodiment of fan shafts 126, 138 is a one piece shaft that can accommodate one retaining nut 133, 145. A benefit of a one piece shaft is easy replacement and assurance that the fan hubs of fans 34, 104 are securely mounted. The fan shafts 126, 138 can use two different sizes for bearings 44, 106 and still be locked down with one nut.

An important innovation of fan shafts 126, 138 is hub plate hub plate 128, 140 being milled into the shaft. With hub plate 128, 140 integrated as part of a solid shaft, the risk of rotor hub failure is minimized. The front of the fan shaft 126, 138 is conventional with a reversed threading 127, 139 to lock down the fan 34, 104 to hub plate 128, 140 to hold fan 34, 104 in place. Fan shaft 126, 138 is preferably milled down to accommodate one of pairs of bearings 44, 106. The shaft of fan shaft 126, 138 has a seating for both of each pair of bearing 44, 106. Rear bearing seat 32, 102 is also incorporated into the shaft for the second of the pair of bearings 44, 106. Standard threading 132, 144 located at a rear end of fan shaft 126, 138 for receiving a locking Allen screw nut. Once in place, the entire main drive assembly is free to rotate but not to move forward or backward as it is retained in the nacelle.

b) Hover Control System

In one embodiment, microfan 228 (FIG. 18) is added to puffer tubes 230, 232, 234, 236 to create a steady flow out to the puffer controls. The system is designed to be passive.

c) Bypass Duct

To achieve a more realistic look of the Harrier jump jet, bypass inlet regulator doors 172, 202 are added to the bypass ducts 160, 190. The airflow can be controlled with bypass inlet regulator doors 172, 202. The air supply is drawn through bypass ducts 160, 190 into transitory diffuser 82.

III. Nozzle System a) Thrust Nozzles

Thrust nozzles 60, 62, 116, 117 direct thrust from fans 34, 104. To direct the thrust in two different directions, the design employs four adjustable nozzles 60, 62, 116, 117. Nozzles 60, 62, 116, 117 are linked in tandem per side. All four nozzles 60, 62, 116, 117 are operated together for even and balanced thrust positioning. Each of first duct chamber 14 and second duct chamber 80 has two nozzle arms, i.e., first nozzle arms 52, 54 and second nozzle arms 112, 113, one on each side to facilitate symmetrical swivel action at each of nozzles 60, 62, 116, 117. Thrust nozzles 60, 62, 116, 117 are preferably attached by a threaded rib collar located on a terminal end of nozzle arms 52, 54, 112, 113. Nozzles 60, 62, 116, 117 are designed to augment the air flow from fan 34, 104 via the thrust vectoring duct, i.e., thrust arms 52, 54, 112, 113. Nozzles 60, 62, 116, 117 are swiveled by nozzle rotation servo 272. In unison, nozzle rotation servos 272 push and pull nozzles 60, 62, 116, 117 on each side of the compressor to direct thrust down for vertical takeoff or back for forward flight. Nozzles 60, 62, 116, 117 direct thrust down or to the aft of the aircraft. The directed thrust provides vertical lift or forward motion.

The aircraft incorporates symmetry of the thrust dispersion to balance the engine/aircraft in hover, vertical or forward flight. Nozzles 60, 62, 116, 117 are positioned to provide the maximum support in all three ranges of flight. The ability to move the thrust angle by pivoting nozzles 60, 62, 116, 117 is an important feature of the invention.

IV. Hover Control System

Hover flight control system 220 includes controls that are powered by air vented off the main air flow from fans 34, 104. The primary vents, i.e., hover ports 37, 121 for the system are integrated into pressure rings 36, 120 located behind each ducted fan 34, 104. Each hover port 37, 121 protrudes from the top of casing 10. Hover control ports 37, 121 funnel air out to the hover controls 239, 240, 241, 242. Preferably, tubes 230, 232, 234 and 236 are used to keep the siphoned air mass pressurized. By using micro inline fans 228 (FIG. 18) inside tubes 230, 232, 234 and 236, the controls 239, 240, 241, 242 are close to the airflow generation to maximize the amount of air available in the sub system. Each tube 230, 232, 234, 236 provides the air for one reaction control 239, 240, 241, 242. Pitch, yaw, and roll can be controlled by adjusting the direction of the airflow exiting from each of the designated tubes 230, 232, 234 and 236.

a) Puffer Controls (Reaction Controls)

The reaction control ports or the puffer controls 239, 240, 241, 242 give the platform directional control during hover. Tubes 230, 232, 234 and 236 lead out to reaction controls 239, 240, 241, 242 at the wing tips and tail. Hover flight control system 220 provides some control of the aircraft in hover and vertical flight. The operation of the reaction controls 239, 240, 241, 242 incorporates gyro syncopation to maintain attitude and orientation. The reaction hover controls 239, 240, 241, 242 are operated by a servo augmented by a gyro. Reaction control servos 225, 227 and 223 can move centrally pivoting puffer flap 244 to angle airflow up and down or left and right. Puffer flap 244 is controlled by one of reaction control servos 225, 227 and 223 and set to always achieve flat stable level position in hover. In flight adjustments may also be made for providing better maneuverability. Reaction control servos 225, 227 and 223 are gyro augmented. Reaction control servo 235 is connected to a puffer flap 244 (shown in FIG. 18) by a push rod and can be calibrated for a specific configuration or flight characteristic. As shown in FIG. 1, hover controls 239, 240, 242 and 242 are located in the tail and on the wing tips of the aircraft. Hover controls 239, 240 in the wings are oriented to direct air puffs either upwards or downwards. Hover controls 241, 242 are placed with one hover control oriented to direct air puffs in a upward or downward direction and one oriented to direct flow in a side to side direction. Gyros 222, 224 and 226 detect any change in balance, level or angle of the aircraft and provide instruction to activate a necessary puffer to effect an opposite reaction to counteract the motion, by directing airflow through one of tubes 230, 232, 234 or 236 to effectively keeping the aircraft balanced in proper orientation relative to the pilot's command. The hover controls 239, 240, 241, 242 regulate the amount and direction of air focused at the control points at the ends of tubes 230, 232, 234 and 236 enabling the craft to maneuver during hover.

V. Cone Valve Assembly

Cone valve 70 regulates the pressure airflow between first fan 34 and second fan 104. An important feature of the invention is the ability to adjust airflow between first fan 34 and second fan 104. To accomplish this, cone valve 70 regulates the amount of air drawn in by second fan 104. Some of the thrust from first fan 34 is trapped in a constant vacuum created by second fan 104. At this point, the size of the opening in cone valve 70 can be increased or decreased by rotating bottle assembly 72 to balance the thrust output in both the front nozzles 60, 62 and rear nozzles 116, 117. Cone valve 70 consists of a cone valve casing 74 separating first duct chamber 14 and second duct chamber 80, a rotating bottle assembly 72 defining a bottle assembly hole 76, and cone valve casing opening formed into cone valve casing 74. The bottle assembly 72 rotates to align or offset the bottle assembly hole 76 and the cone valve casing opening 78. Cone valve 70 is preferably sloped and tapered toward the front to reduce resistance to the air mass from first fan 34. Cone valve 70 is operated by cone valve servo 254. An arm of cone valve servo 254 moves bottle assembly 72 in the same arc radius of rotation as bottle assembly 72. Cone valve servo 254 and bottle assembly 72 are connected by linkage arms that travel thru casing 10. Cone valve 70 is actuated by cone valve servo 254 and can be adjusted for barometric pressure, temperature, and humidity. When cone valve 70 is closed, each fan unit 34, 104 has its own air supply. Cone valve 70 is tied to bypass inlet regulator doors 172, 202 by electronic means. This insures that the air entering second fan 104 is mixed part high pressure bleed from first fan 34 and moderate pressure bleed from the bypass duct 160, 190. Balance between fans 34, 104 is as important aspect of the invention. Cone valve 70 is actuated by rotation of the control arm of cone valve servo 254 mounted outside the duct casing. Cone valve 70 is integrated with bypass ducts 160, 190.

VI. Stator Flaps

Stator flaps 38, 118 adjust air from fans 34, 104. To augment thrust generated by fan 34, 104, flaps 38, 118, are located at the rear of stator 30, 100. Stator flaps 38, 118, pitch air exiting fan 34, 104 into a rotating mass confined within the respective duct, i.e., within first duct chamber 14 or second duct chamber 80. Rotation of the air mass promotes better suction draw and enhanced ram effect offering better flexibility of the air mass throughout the overall system. This design incorporates stator flaps 38, 118, to pitch the exiting air mass into a rotation within the duct chamber 14, 80. Preferably, stator flaps 38, 118, are moved at once as a unit by moving the control ring 41. Flaps 38, 118, are actuated by lever arms connected to control ring 41. Flaps 38, 118, are controlled by stator flap servo 258. Stator flap servo 258 is controlled in unison with cone valve servo 254, bypass duct servo 252, bypass inlet regulator doors 172, 202 and bypass duct regulator door 174, 204. Bypass duct servo 252 moves two sets of flap assemblies 172, 174, 202, 204 in a push/push-pull/pull fashion. Servos 252, 254, 256, 258 are electrically calibrated to match the incremental movements with the cone valve 70, bypass doors 172, 202, 174, 204, and stator flaps 38, 118. Flaps 38, 118, are also tuned to the duct assembly 14, 80 by mechanical screw adjustment at both ends of push rod arms.

Stator flap servo 258 operates the stator flaps 38, 118, using a push/push-pull/pull type arm. The stator flaps 38, 118, are moved simultaneously in each of the two duct assemblies 14, 80 with the ability to adjust the flap pitch both electrically and mechanically in unison with cone valve 70 and bypass inlet regulator doors 172, 202. Stator flaps 38, 118, are connected to stator flap servo 258 via a bend transom arm. The arm transfers motion from stator flap servo 258 to flaps 38, 118. In this case, the stator flap servo 258 is oriented perpendicular to the stator flap 38, 118. The transom redirects the linear motion to a rotational force using control ring 41 to pivot the flaps 38, 118. The stator flap actuator arms are angled to absorb the applied motion into a rotational motion that angles flaps 38, 118. As the servo arm moves the push rod forward, the kinetic energy is transferred to control ring 41. The flap arms are the actual pivot point for control ring 41. As a result, the arms swing one direction when force is applied at one main connection point. When force is reversed, the arms return flaps 38, 118 to their original position.

VII. Vortices Generators

Vortices generators 56, 58, 114, 115 create a low pressure tornado vacuum within nozzle arms 52, 54, 112, and 113. Vortices generators 56, 58, 114, 115 induce an artificial imbalance within an airflow to increase performance. To enhance the thrust generation developed by fans 34, 104, vortices generators 56, 58, 114, 115 are located to eliminate stagnant air mass locations by creating a passive vacuum that will draw in more air. The available air is pulled into a tornado-like swirling air mass and compressed as the air pathway tapers smaller toward nozzles 60, 62, 116, 117.

Vortices are generated symmetrically within nozzle arms 52, 54, 112, 113. Vortices generators 56, 58, 114, 115 are symmetrical and placed in the selected locations to gain from the curvature of nozzle arms 52, 54, 112, 113. The swirling air mass from fans 34, 104 is easier to bend as nozzle arms 52, 54, 112, 113 curve outward toward nozzles 60, 62, 116, 117. The air mass is almost choked off at the inner curvature of nozzle arms 52, 54, 112, 113. To alleviate the problem of unproductive gulf of slipstream air, a set of fins or vortices generators 56, 58, 114, 115 are positioned to generate a small low pressure tornado-like vortices. These tornadoes draw the stagnating air at the outer curvature of nozzle arms 52, 54, 112, 113 and whip it into a vacuum. In turn, the air rushing into the narrowing bent nozzle arm 52, 54, 112, 113 is caught in the action, absorbed and straightened into a fluid rotation by vortices before the mass reaches nozzle 60, 62, 116, 117. To better guide the air mass within the thrust vectoring portion, rear thrust tube 108 from the nacelle is tapered to match the casing and direct the air toward cone valve 70 and thrust nozzles 60, 62, 116, 117.

VIII. Duct Flaps

Duct flaps 55, 111 catch thrust from fan 34, 104 and angle the thrust toward vortices generators 56, 58, 114, 115. Just as stator flaps 38, 118 pitch air flow from fans 34, 104 into rotation, duct flaps 55, 111 angle into rotating incoming air and redirects the air towards nozzles 60, 62, 116, 117. This action effectively splits the thrust mass into two distinct flows. Duct flaps 55, 111 are set by the pitch of stator flaps 38, 118. Duct flaps 55, 111 are positioned where the airflow is to split from the main thrust column. Duct flaps 55, 111 move to capture the air mass exiting from fan 34, 104. The inside of duct chamber 14, 80 is shaped to promote a sleek unrestrained airflow to thrust nozzles 60, 62, 116, 117. Duct flaps 55, 111 control the sweep of the air mass in reference to original thrust angle direction. This action creates a bend in the air mass that is not substantially affected by directional shift energy loss, i.e., the air mass retains structure and solid pressure. For control, duct flaps 55, 111 have arms controlled opposite to the arms of stator flaps 38, 118. Otherwise the arms and design of duct flaps 55, 111 are the same as the stator flaps 38, 118. Each of duct flap servo 256 and stator flap servo 258 is connected to two assemblies and acts as push/push-pull/pull type swing arm. The servos 256, 258 are connected to the flap arms by a connecting push rod. There is no control ring so the push rods connect to the actual arm of duct flap 55, 111 that wraps around the casing.

IX. Intake Shroud

Intake shroud 12 scoops air into first fan 34. Intake shroud 12 provides airflow to fans 34, 104 so that fans 34, 104 can generate thrust. Intake shroud 12 is an opening designed to scoop a large amount of air into the fan system both in forward flight and in hover flight. The shape of the structure of intake shroud 12 is designed to streamline incoming air and align the air flow to the blade pitch of first fan 34. Outer lip 16 of intake shroud 12 is slightly smaller than the duct area to promote expansion pressure of air entering the system. Intake shroud 12 has four main functions: (1) funnel air to first fan 34; (2) support bypass ducts 160, 190 to access a fresh air supply; (3) maintain pressure within first fan 34; and (4) provide a structural support for the fuselage assembly. Intake shroud 12 incorporates bypass inlet vents 18, 20 around the outside perimeter. The front of intake shroud 12 accommodates a location for the airframe nose assembly.

X. Compressor Assembly a) Modular Compressor Assembly

The compressor is designed to be modular for easy assembly. An important feature of the engine of the invention is simplicity and modularization of the parts used. Each piece integrates into the sub component design of the compressor. This design includes connecting several self-contained units into one large cohesive assembly. Each ducted fan 34, 104 is a unit that fits into a thrust vectoring chamber 14, 80. Building the compressor is straight forward. First two pieces 14 and 80 are connected together and then other parts are added as the structure is formed.

Preferably, assembly begins by connecting main drive assembly 125 since drive assembly 125 is a main component of the engine. Ducted fan units 34, 104 connect to central duct chambers 14, 80 having one fan unit 34, 104 at each end. Intake shroud 12 and rear thrust vectoring duct, i.e., nozzle arms 112, 113, are then attached to the engine core. The first and second fan drive shafts 126, 138 connect together inside this ducting. The main thrust vectoring chamber that includes nozzle arms 52, 54 serves as a mount for both fans 34, 104. Once the core components are assembled, nozzles 60, 62, 116, 117 and support controls can be installed. The entire part is integrated with the fuselage sub frame. The sub frame provides support and rigidity to hold all the parts together. In addition, the sub frame provides mounting locations for sub systems, landing gear and specialty mounts. Once assembled, fans 34, 104 and ducting create an engine sub assembly, i.e., the compressor. A sub frame holds all the delicate pieces together. This compressor/sub frame structure provides a place for fuselage 2 to attach. Wing mounts are also incorporated into the basic design. With each part in place, drive assembly 125 is centered and straightened. Fans 34, 104 have a steady supply of air. The platform has landing gear to support it in the ground. Vital sub systems have internal mountings for all electronic components. The sub frame lends itself to covering and protecting the engine compressor inside. Additional sub structures can be built off the existing piece.

XI. Radio Controller Receiver System

The Hover-Jet of the invention uses a dual receiver control system 300. The radio control of the engine package is operated by a first receiver 302. First receiver 302 controls motor 158 and steering. Second receiver 304 controls engine adjustment, operation of nozzles 60, 62, 116, 117, flight, and hover flight controls system 220. Both receivers 302, 304 are preferably operated in tandem on the same frequency. This setup provides the most usable transmitter channels in the most combinations. An example is the steering system. The steering system is set on the same channel as the rudder. By using two different receivers 302, 304, no interference between yaw servo 227 and roll servo 223 occurs. In addition, the power supply 312 for all the servos is separate from battery 314 that supplies power to motor 158. Thus, needed energy is not diverted from motor 158 to maintain control of the craft. First receiver 302 communicates with ECS 316.

XII. Compressor Adjustment a) System Adjustment Controls

The nozzle system and the compressor tuning system are operated for fine adjustment by flap reversers. The system can be adjusted using electronic means. The flap reverser acts as a way to calibrate the various servos in each system. The flap reverser commands one or more of the connected servos to follow the primary within time. Thrust nozzles 60, 62, 116, 117 can be aligned to each other by turning the control of the designated flap reverser. Thus, nozzle rotation servos 272 operating nozzles 60, 62, 116, 117 can be better oriented to match the rotation and position for all four nozzles 60, 62, 116, 117. The same fine tuning adjustment can be made for the compressor settings. The operation of all the flaps, doors and valves can be controlled by the second flap reverser. This unit aligns the independent servos to operate in unison with each other. Therefore, the compressor can be tuned to environmental conditions. Coupled to an altimeter, the system can calibrate for temperature, humidity, and barometric pressure, which are sensor inputs for an altimeter.

XIII. Gyro Stabilization

Flight controls are balanced by use of gyros on the puffer/avionics system. The platform is controlled in hover by a set of gyros 222, 224, 226. Each gyro 222, 224, 226 controls a particular orientation. Gyro 222 monitors roll. Gyro 224 monitors pitch. Gyro 226 monitors yaw. In the event that the craft in hover starts to become unbalanced, gyros 222, 224, 226 detect this movement and adjust the hover controls accordingly to counteract the motion. Only yaw gyro 226 is set to a heading to maintain directional position. Gyros 222, 224, 226 are oriented for flat stable hover. Working in conjunction with the hover controls 239, 240, 241 and 242, gyros 222, 224, 226 influence the flight performance of the craft. This influence is not limited to hovering maneuvers. During forward flight, puffer controls 239, 240, 242, 242 make viffing techniques possible. Viffing is using thrust vectoring movements during forward flight to change momentum of the platform.

XIV. Motor Bay

The electronic motor bay contains motor 158, ECS, i.e., electronic control speed, i.e., "motor brain" 316 and batteries 312, 314 and may accommodate hover control tubes 234, 236 running from the compressor to the tail. The overall weight of the platform is balanced by centralizing these components. In the electronic motor bay, battery 314 connects to the system on the top side. Battery 314 can be removed by an access hatch on bottom. The motor bay is designed around the assembly of transmission 150 and motor 158. The sub frame encloses this area. The sub frame has mounts for pitch servo 225 and yaw servo 227 within the motor bay.

XV. Landing Gear

Landing gear 330 is important during ground operations such as taxiing the craft out to a flight line, moving about the tarmac or around obstacles on the ground. A steerable front wheel is provided to accomplish these tasks. The main design of the landing gear is intended to mimic the landing gear of a Harrier Jump Jet. The inline setup carries the weight of the craft and spreads it over the length of the support. The frame is integrated into the sub frame assembly. To prevent rollover on the ground, two small wing wheels are employed. Wing wheels permit the craft to remain flat and level regardless of the type of terrain.

XVI. Summary

The following is a description of the invention relating to how the components work together in use.

Intake shroud 12 is provided to feed air into the device. First pressure ring 36 resides within the full circumference of intake shroud 12. Intake shroud 12 leads to first duct chamber 14. First duct chamber 14 contains the thrust chamber. First fan 34 is mounted into the nacelle riding on a first pair of bearings 44. Bearings 44 are held in place by bulwark walls at the front and rear of the nacelle. The structure is preferably internally supported by two long screws spanning between the bulwark walls. The nacelle is the center of first stator assembly 30. At the trailing edge of stator assembly 30 are adjustable flaps or front stator flaps 38. Flaps 38 are contoured to the first pressure ring 36 and the thrust tube 108.

Drive shaft assembly 125 spans the center of the nacelle and duct housing allowing free and unhindered movement for fan 34. The sub assembly consists of a spinner, the rotor hub and fan 34, the first fan shaft 126, retaining nut 133 and u-joint 134. The unit is designed for quick and easy installation and removal or replacement. Retaining nut 133 is located at the rear of first fan shaft 126 and is the main retaining device for the first fan shaft 126.

Referring now to FIGS. 4 and 5, starting at the front of the compressor, intake shroud 12 consists of openings on each side of a central section. The center section slopes inward to a point in front of first fan 34. The shroud narrows down to first duct chamber 14.

Bypass inlet vents 18, 20 funnel air to second fan 104 by bypass ducts 160, 190. Air volume is controlled by bypass inlet regulator doors 172, 202 mounted inlets 18, 20 operated by a bypass duct servo 252 with push rods and linkages. Bypass ducts 160, 190 connect to transitory diffuser 82 at the other end.

First duct chamber 14 consists of the duct shell, first stator assembly 30, and the drive shaft nacelle with rear thrust tube 108. First fan 34 is the heart of the system, generating massive amounts of thrust. First duct chamber 14 contains the thrust and forces it in one direction. First stator 30 angles the airflow initiating a rotation in the mass. The trailing edge of the stator wings houses stator flaps 38 that can adjust the pitch for best performance. Stator flaps 38 are operated by stator flap servo 258 connected by push rods and lever arms.

The center portion of first stator 30 is the drive shaft nacelle. The drive shaft nacelle contains all the necessary components to incorporate drive assembly 125 to spin first fan 34. First fan 34 is mounted on drive assembly 125 within the nacelle. Drive shaft assembly 125 accommodates a fan mount at one end and u-joint 134 at the other.

At the rear of first duct chamber 14 is pressure ring 36 having two hover vents 37 for feeding the hover flight control system 220 and provides for a thrust vectoring duct mount. First duct chamber 14 tapers down a bit after first fan 34 and then splits outwardly at first split 50. The air flow then turns almost 90 degrees toward the outside within nozzle arms 52, 62 as the curvature creates additional vacuum/ram effect.

At the point of separation above and below cone valve 70, first duct chamber 14 duct has front duct flap 55 to catch the air mass from first fan 34. Duct flaps 55 turn opposite to each other but properly align to the onrushing airflow and direct it toward nozzles 60, 62. Duct flaps 55 are also operated by a servo, i.e., duct flap servo 256 and push rod linkages.

Thrust nozzles 60, 62, 116, 117 offer the ability to change the thrust output direction. Nozzles 60, 62, 116, 117 are operated by two nozzle rotation servos 272, one on each side of the craft for moving two of nozzles 60, 62, 116, 117 at the same time. Nozzles 60, 62, 116, 117 are round on one end and tube shaped on the other. The shape of nozzle 60, 62, 116, 117 is to force the thrust into one direction. To accomplish directional control, nozzle 60, 62, 116, 117 is fitted with threads on the inside of the round section. On the thrust vectoring duct outlet or outlet of nozzle arms 52, 54, 112, 113, there is a collar with corresponding threads to threads on nozzles 60, 62, 116, 117. Nozzles 60, 62, 116, 117 screw onto the collar on nozzle arms 52, 54, 112, 113. The connection allows nozzles 60, 62, 116, 117 to move but be retained at the same time.

In the center of the first thrust vectoring duct is cone valve 70. Cone valve 70 is a pointed shaped valve that regulates the vacuum draw of second fan 104. Cone valve 70 has a rotationally mounted bottle assembly 72 inside. Each piece has a set of holes in it. Cone valve 70 is operated by cone valve servo 254 in a twisting fashion to align (open) or offset (close) bottle assembly holes 76 and cane valve casing opening 78.

Cone valve 70 and bypass duct regulator doors 174, 204 regulate airflow entering second fan 104. To mix the two independent air streams, a transitory diffuser 82 is used. Transitory diffuser 82 has one central port from cone valve 70 and four bypass duct ports 84, 86, 88 and 90 along an outer edge. Second duct chamber 80 mounts to a large end of transitory diffuser 82. Second duct chamber 80 and thrust vectoring assemblies are the same as those of first duct chamber 14.

The second fan nacelle assembly is identical to the first and mounts second fan 104 in the same fashion. The two fans 34, 104 are connected together by drive assembly 125. First u-joint 134 on first fan 34 is connected to second fan 104 by second u-joint 136 attached to a specially designed spinner or fan connector 137 on second fan 104. Fan connector 137 has a mounting stud for attaching to second u-joint 136.

Second fan shaft 138 is also connected to a drive link like the first assembly. The second double u-joint, i.e., including u-joints 146, 148, connects the fans 34, 104 to transmission 150. Transmission 150 applies rotational power to fans 34, 104. The energy can be provided by a motor or engine, such as motor 158.

To hold the compressor in place and add structural stability to the aircraft, a sub-frame is used. This frame joins the nozzle mounts or nozzle arms 52, 54, 112, 113 together as a single unit on each side. Four bulwarks are connected from the front to the back of the side panels enclosing the compressor providing space for all the sub components and mechanisms.

The sub-frame incorporates all the mountings for the wing section. In addition, the sub-frame provides the infrastructure for landing gear 330. In one embodiment, a foam fuselage is cast around the sub structure. When completed, the engine compressor will be in the foam airplane with easy access to the major components by removable access panels and under the removable wings.

Starting at the front of the aircraft and engine, intake shroud 12 is bi-merging with one section on each side of a central mounting. Intake shroud 12 has a lip 16 on the very front edge making the opening slightly smaller than first duct chamber 14. Inner walls of intake shroud 12 on both sides slope inward and merge together in front of the first fan 34. Outer walls converge as a reverse cone down to the size of the duct surrounding fan 34.

As the outer walls of intake shroud 12 narrow just before first fan 34, an inner pressure ring 36 provided just in front of first fan 34. The ring 36 covers the space between the fan tips and the casing.

Duct chambers 14, 80 are incorporated into the casing and provide support structure to the nacelle through the wings of stators 30, 100. The duct for first fan 34 is mounting for intake shroud 12 and the thrust vectoring duct mount. The section is sealed together as one unit. The ducts also include the pressure ring mounts.

Fan 34, 104 is center mounted in duct chamber 14, 80 by stator assembly 30, 100. The duct and stator provide support for the fan assembly. The center of stator assembly 30, 100 is a nacelle behind the hub of fan 34, 104 that houses the bulkhead walls, bearing races, and structural supports. The fan hub is connected to the front of first fan shaft 126 by a lock down nut.

First fan shaft 126 rides on bearings 44 inserted into the nacelle. First fan shaft 126 is milled to accept bearings 44 and accommodate a locking nut to hold the drive assembly 125 in place. The front of first fan shaft 126 is threaded with left-handed threads on threaded hub mount 127 to resist centrifugal force under rotation load. The fan hub nut is also left-handed counter threaded so it can lock down on first fan shaft 126 against the hub of first fan 34.

The rear end of the drive shaft is standard right handed threaded 132 to accommodate a bearing retaining nut 133 pressuring down on the rear bearing of bearing pair 44. The nacelle provides stability with two bulkhead plates, one at each end. These bulkheads are where the bearing races are located and accept the centrifugal force load of the rotation of first fan 34. The end of the first fan shaft 126 has a mount for first u-joint 134.

The nacelle is encased by rear thrust tube 108. Rear thrust tube 108 fits around the wings of first stator 30 and tapers down backwards. The wings of stator 30 have adjustable flaps 38 on the trailing edges. Flaps 38 have a control rod at the lead edge. One end of the control rod is pivoted into the nacelle and the other end protrudes out the wall of casing 10. The external portion of the control rod is bent to connect to an actuator of stator flap servo 258.

The outer casing on the inside of the thrust vectoring extension beyond the stator flaps 38 narrows into a rear pressure ring 120. Rear pressure ring 120 defines a pair of rear hover ports 121. Rear hover ports 121 supply pressurized air for the hover flight control system 220. Rear hover ports 121 vent to the hover control vents 239, 240, 241, 242 at the wing tips and tail via tubes 230, 232, 234, 236.

After rear pressure ring 120, second duct chamber 80 tapers down a bit. It is at this point that the casing shape starts to twist outward from center very softly. The casing shape is mirrored by the rear thrust tube 108. The end of rear thrust tube 108 is connected to cone valve 70 directly. Cone valve 70 is in the center of the thrust vectoring duct and protrudes out towards the front from a front split 50 deviation of the duct from the top to the bottom in the casing's shape. Front split 50 defines an edge that has duct flaps 55 facing the air flow to bite into and direct the air mass to the sides, i.e., into nozzle arms 52, 54 and sets rotation. The casing continues to taper down as the duct turns to a perpendicular angle to the original thrust direction. On the inner curve of the casing, i.e., of the nozzle arms 52, 54, vortices generators 56, 58 are positioned at the point where the air flow begins to break. As the air goes through the vortices generators 56, 58, a vacuum disturbance is created and draws in the air around it. Essentially, the solid air mass of thrust from first fan 34 is sucked into a mini tornado. The nozzle arms 52, 54 of the casing reduces to a collar ring nozzle port which houses the nozzle mount. Nozzles 60, 62 then redirect the inducted air flow out as thrust.

Nozzles 60, 62 are hollow like the nozzle arms 52, 54 of the casing duct. Nozzles 60, 62 redirect the air flow. Each nozzle 60, 62 rides on a threading formed in the wall of nozzle 60, 62. This threading accepts a counter threading on the outer edge of the nozzle arms 52, 54. The connection holds nozzle 60, 62 to the casing duct and accommodates rotation of the nozzle 15 degrees. This is necessary to move nozzle 60, 62 from pointing down for vertical flight and backward to the aft for horizontal flight. Nozzle rotation servo 272 operates the action.

Both duct assemblies, i.e., first duct chamber 14 and second duct chamber 80, are identical in design, but there are modifications to the casing to enhance the performance between them. Cone valve 70 separates the two fan chambers 14, 80. Cone valve 70 has adjustable holes to siphon air from front fan 34 to feed second fan 104. Cone valve 70 is operated by cone valve servo 254 and rotates to open and close. The cone valve casing 74 of cone valve 70 has cone valve casing openings 78 and the bottle assembly 72 (cone part) has bottle assembly holes 76 in it. By rotating the bottle assembly 72 the openings 76, 78 align OPEN and when reversed offset each other CLOSED. This allows regulation of the air pressure and vacuum between ducts 14, 80.

The casing from cone valve 70 expands into transitory diffuser 82 which slows the vented air from first fan 34 and mixes it with the bypass air stream from bypass ducts 160, 190. Transitory diffuser 82 expands to the size of the duct of second fan 104. Four ports 84, 86, 88, 90 are situated around the casing. These ports are the other end of the bypass duct 160, 190 from that of the intake section that contain inlet vents 18, 20. The air from ports 84, 86, 88, 90 is adjustable by using the inlet vent doors 172, 202 at the front. The idea is to use cone valve 70 and the bypass doors 172, 202, 174, 204 to regulate the air entering second fan 104 and can be calibrated to temperature, barometric pressure, and humidity.

Second duct chamber 80 is the same as the first unit. One exception to the design is the spinner or fan connector 137 on second fan 104. Fan connector 137 is designed with a mounting for connecting to u-joint 136. Fan connector 137 is the connection between both fan units 34, 104. A telescoping double ended two piece u-joint assembly joins first fan shaft 126 of first fan 34 to second fan 104 wherein the end of each u-joint bridges the gap through cone valve 70 and transitory diffuser 82. With this configuration, fans 34, 104 are linked like a turbine. The fan shafts 126, 138 are locked together by u-joints 134, 136.

Second fan 104 is identical to first fan 34 and shares the same nacelle design and structure. The same bearing races and stator support are integrated into the design. The fan duct is connected to the outer casing at the front by transitory diffuser 82, effectively making the space between fans 34, 104 air tight and capable of pressurization.

The nacelle of second fan 104 is also encased by a rear thrust tube 149, which mirrors the shape of the casing as in the first duct chamber. The wings of second stator 100 are incorporated with rear stator flaps 118 and adjustable controls. Second fan 104 also has a pressure ring in the same location as first fan 34. The outer casing of the thrust vectoring extensions flairs out similarly to nozzles 116, 117 similar to the action in nozzles 60, 62 discussed above. The inner structures include vortices generators 114, 115 and duct flap assemblies 111. The thrust tube is connected to cone valve type shaped structure with no holes. This transom is hollow and accommodates a space for the second set of telescoping two piece double ended u-joint assemblies.

The rear end of the second fan shaft 138 includes a u-joint connection 146. This section of the drive assembly 125 connects transmission 150 to fans 34, 104. Transmission 150 is mounted to the casing by cast mounts. Transmission 150 is aligned to drive assembly 125 outside of the compressor. The transom is open to accommodate u-joint 148 on transmission 150 and u-joint 146 connecting second fan 104.

Transmission 150 is preferably constructed out of aluminum and consists of three gears. In order from drive shaft assembly 125 is the smallest (output gear 156), largest (drift gear 154), and medium (drive gear 152) gears. The power plant, such as a motor 158 to supply rotation to transmission 150, generates rotation, thereby enabling fans 34, 104 to create thrust. Drive gear 152 is mounted to motor output shaft 159 and supplies through direct drive the rotational energy to the large drift gear 154. Drift gear 154 transfers the energy to output gear 156, which is connected to the drive shaft assembly 125. Transmission gears 152, 154, and 156 up input from the motor 2.8 rotations on the drive shaft assembly 125 to every 1 rotation of motor 158.

To actuate all these adjustable features, three sub systems are integrated to work together. The first is the hover flight controls system 220, the second is the airflow system controls, and the third is the nozzle controls. Each system operates two or more servos to move flaps, valves, doors, and nozzles in an attempt to achieve sustainable vertical and hover flight.

XVIII. Hover Flight Controls

The first system is the hover flight controls system 220. Hover flight controls system 220 consists of three gyros 222, 224, 226 for orientation of the platform. Each gyro 222, 224, 226 is positioned for input from one of three centers of gravity responding to pitch, yaw and roll characteristics. Each gyro 222, 224, 226 relays input information to the corresponding servo set 225, 227, 223, which moves the puffer control unit 239, 240, 241, 242 on the wings and tail. The hover controls are supplied air from the hover vents 37 located in the pressure ring 36 at each fan unit (missing rear). The hover control consists of a tube 230, 232, 234, 236 with a microfan 228 connected to the port at one end and a waste gate type vent assembly at the outer end. The puffers or hover controls 239, 240, 241, 242 have a separating centrally pivoting flap 244 to direct the air out ducts situated up and down for pitch and roll control and left and right side for yaw control. Pivoting flap 244 has an actuator arm on one side protruding out the puffer control unit 239, 240, 241, 242. The puffer servo 235 is connected to the arm by a push rod. The intent is to use gyros 222, 224, 226 to control the aircraft in hover by detecting any imbalance and compensating the proper counter action to keep the craft flat and level.

The flight controls and avionics systems are symmetrical and work in conjunction with the hover controls. Both systems work together to perform desired pilot commands. It is the balance between the control surfaces and orientation ports that enables unique flying.

XIX. Compressor Airflow Control

The second sub system is the compressor airflow control. This system consists of four servos. Bypass duct servo 252 controls the bypass duct vent doors 174, 204. Cone valve servo 254 controls cone valve 70. Duct flap servo 256 controls duct flaps 55, 111 in the thrust vectoring extensions. Stator flap servo 258 controls the stator flaps 38, 118. These servos are bused together and linked by one channel on second receiver 304. By busing servos 252, 254, 256, and 258 together, all the controls can be operated by one input. Synchronization of the flaps, doors and valve is accommodated both electronically with radio servo adjustments using flap reverser and mechanically by threaded connections at the actuator arm, lever and servo yoke.

XX. Nozzle Control

The third system is the nozzle control. This system rotates nozzles 60, 62, 116, 117 into down or aft positions. Two nozzle rotation servos 272 are used with a flap reverser to control and equalize the movement between the four thrust nozzles 60, 62, 116, 117. To operate the nozzle rotation, the servos 272 are mounted as one unit on each side of the compressor between the front and back nozzle set. The servos 272 are seated in the sub frame to offset the difference in nozzle stance. The servos 272 have four inch arms and are connected to nozzles 60, 62, 116, 117 via bent metal push rods. Nozzles 60, 62, 116, 117 have control horns to receive the push rods. The system is a push/push or pull/pull operation to move nozzles 60, 62, 116, 117.

Nozzles 60, 62, 116, 117 rotate on the mounting collar similar to a jar top. The mounting collar is a threaded piece on the distal ends of nozzle arms 52, 54, 112, 113. Nozzle 60, 62, 116, 117 has a connector ring that matches the threading of the collar on nozzle arms 52, 54, 112, 113. Once threaded to each other, nozzles 60, 62, 116, 117 ride on the threads loosely for rotation of 15 degrees. As the arms of servos 272 move forward, nozzles 60, 62, 116, 117 point backwards until full movement is reached. Nozzles 60, 62, 116, 117 operate also in reverse to return to the down position.

The entire compressor package is enclosed in a sub frame. The frame consists of nozzle mounts, bulwarks holding the thrust vectoring casing, and internal compartments for sub systems. The sub frame is a box structure like a uni-body that accommodates other avionics structures. The frame is supported by the landing gear chassis. The overall sub frame assembly integrates the fuselage and wings into one package and provides internal structure and support for the aircraft.

In a preferred embodiment, the avionics control is operated by the same servo system as hover controls. Thus, flight control is the same for both forward flight and hover, The gyros work in both regimes.

The fuselage style chosen for this example is a scale harrier jump jet, although this design can accommodate other styles or configurations. The ideal embodiment of the airframe is manufactured foam with carbon fiber reinforced fiberglass covering for both the body and wings in two main sections, the wings as one unit and the fuselage as another. This will allow for easy transport and internal access.

In operation, an altimeter is set for proper altitude based on sea level. The aircraft is switched on and motor 158 chimes notifying that it is armed and ready for operation. Moving the throttle forward raises the RPM of motor 158 and begins to spin first fan 34 and second fan 104. The fans 34 and 104 spin up to speed generating thrust necessary to lift the craft off the ground. The sub system compressor controls, e.g., flaps 38, 55, 111 118, cone valve 70 and doors 172, 202, 174, 204 are set for maximum performance under current environmental conditions. As motor 158 increases in RPMs transmission 150 spins the fans 34, 104 faster until lift is achieved. The aircraft rises off the ground. Throttle is increased until the aircraft is high enough off the ground to make transition to forward flight. During the hover phase, small adjustments can be made to the position of the aircraft position by using the flight/hover controls 239, 240, 242, and 242. Turning the craft is accomplished by moving the rudder control left or right, which the rudder on the aircraft as well as flap 244 for directing air in hover control 241 at the tail for the yaw (left/right). As the aircraft moves upward, the pilot can tilt the craft by using the elevator control to pitch the nose up or down. As the elevator controls move, the pitch hover controls moves as well, e.g. vertical tail hover control 242. The controls are set so both avionics systems move the aircraft in the same direction in both flight regimes. Tilting the nose up slightly will position the craft into a better angle for a transitional glide into forward flight.

It is important to position the aircraft into a glide to move the weight of the plane onto the wings as soon as possible so the nozzles can be moved into the forward flight configuration. To do this the pilot activates the nozzle control, e.g., nozzle rotation servo 272, and moves the position of nozzles 60, 61, 112, and 113 from pointing down to pointing rearward. As this happens gyros 223, 225, 227 use the hover control system, e.g, hover controls 239, 240, 242, 242, to keep the aircraft in proper orientation. As nozzles 60, 61, 112, and 113 move the thrust rearward, the aircraft will begin to move forward. Slowly at first but as nozzles 60, 61, 112, and 113 redirect the thrust, the pilot should increases the throttle. It is at this point the flight controls take authority. The rudder effects the trim of the craft to keep it pointed in the intended direction even against headwinds. The elevators position the craft to move up or down and the ailerons (flaps on the wings) roll the aircraft left or right as in turning. The airplane moves forward faster and faster as the more air is drawing in through intake shroud 12 to the compressor and the throttle increases. It is at this point that the pilot is flying the aircraft. As the craft is prepared for landing, nozzles 60, 61, 112, and 113 are repositioned to the vertical or "pointed down" position. The aircraft will then slow down and begin to lose altitude.

The pilot should keep the throttle setting high as the approach is aligned. The aircraft will continue to drop lower and lower. Nozzles 60, 61, 112, and 113 should remain positioned downward support the craft as the ground gets closer. During this transition the pilot can control the craft using the hover controls 239, 240, 241, 242 and a blend of the flight controls in a manner similar to drifting. The pilot should then slowly lower RPMs of motor 158, which decreases the thrust and lowers the aircraft. To compensate for cross winds, the pilot can control the plane using the pitch, roll or yaw commands to activate hover controls 239, 240, 241, 242 for positioning the craft for landing. Lowering the throttle will continue to drop the airplane closer to the ground. Just before contact with the ground, the pilot should increase the throttle to cushion the craft in ground effect. Ground effect is a layer of air that is trapped under the wings and has greater pressure than the force of gravity. This temporary effect is compensated by lowering the throttle even more. Once the aircraft has landed, the throttle may be lowered completely and the aircraft may be turned off Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. An aircraft comprising:
  a fuselage defining a first wing, a second wing, and a tail section;
  a compressor in said fuselage, said compressor defining an intake opening:
  a first fan and a second fan in said compressor;
  a drive shaft interconnecting said first fan and said second fan;
  a motor for rotating said drive shaft;
  a transmission in communication with said motor and said drive shaft for gearing up an output of said motor;
  a bypass duct for directing airflow to a location in front of said second fan;
  a plurality of nozzles for directing air flow out of said compressor in a selected one of a vertical or non-vertical direction;
  hover tubes extending from said compressor to adjust the aircraft in pitch, yaw and roll;
  wherein said compressor has a first chamber and a second chamber;
  said first fan is in said first chamber;
  said second fan in said second chamber;
  said first chamber and said second chamber interconnected via a selectively openable valve that remains open to regulate air flow from said first fan to said second fan; and
  said valve comprises an outer casing defining openings,
  an inner rotating member contained within said outer casing, said inner rotating member defining openings;
  wherein said inner rotating member may be selectively rotated to align said outer casing openings and said inner rotating member openings.

2. The aircraft according to claim 1 wherein:
  said bypass duct has a bypass duct intake adjacent to said intake opening;
  said bypass duct delivers air to said second chamber; and further comprising
  a bypass duct intake door for selectively controlling an intake of air into said bypass duct;
  wherein said bypass duct intake door selectively restricts said intake of air, but does not close off airflow to said second chamber.

3. The aircraft according to claim 1 further comprising:
  a bypass duct intake door for selectively controlling an intake of air into said bypass duct;
  wherein said bypass duct intake door selectively restricts said intake of air, but does not close off airflow to said second chamber.

4. The aircraft according to claim 1 wherein said hover tubes comprise:
  a first tube extending a length of said first wing, said first tube communicates with a first hover control vent having an upper branch for providing an upwards air pulse above said first wing and having a downward branch for providing a downwards air pulse below said first wing;
  a second tube extending a length of said second wing, said second tube communicates with a second first hover control vent having an upper branch for providing an upwards air pulse above said second wing and having a downward branch for providing a downwards air pulse below said second wing;
  a third tube extending to said tail section, said third tube communicates with a third first hover control vent having a first branch for providing a first sidewardly directed air pulse on a first sided of a rudder of said tail section and having a second branch for providing a second sidewardly directed air pulse on a second side of said rudder of said tail section;
  a fourth tube extending to said tail section, said fourth tube communicates with a second fourth first hover control vent having an upper branch for providing an upwards air pulse above an elevator of said tail section and having a downward branch for providing a downwards air pulse below said elevator of said tail section.

5. The aircraft according to claim 4 further comprising:
  a pivoting flap within each of said first hover control vent, said second hover control vent, said third hover control vent, and said fourth hover control vent for directing air in a selected direction.

6. The aircraft according to claim 1 wherein:
  said hover tubes comprise a first tube, a second tube, a third tube and a fourth tube;
  said first tube and said second tube communicate with said first chamber;
  said third tube and said fourth tube communicate with said second chamber.

7. The aircraft according to claim 6 further comprising:
an inline micro fan for augmenting flow through at least one of said first tube, said second tube, said third tube and said fourth tube.

8. The aircraft according to claim 7 wherein:
said first fan is in a first ducted fan assembly and said second ducted fan is in a second ducted fan assembly;
said hover tubes are fed by vents in a fan pressure ring located at an aft end of at least one of said first ducted fan assembly and said second ducted fan assembly.

9. The aircraft according to claim 1 wherein:
said nozzles are threadably attached to said compressor.

10. The aircraft according to claim 1 further comprising:
servos activating control surfaces on said first wing, said second wing and said tail section;
said servos additionally activating control mechanisms of said hover tubes;
wherein said servos function continuously in hover mode and in flight mode to control the aircraft.

11. The aircraft according to claim 1 further comprising:
gyros for stabilization and altitude regulation.

12. The aircraft according to claim 1 further comprising:
actuator arms externally mounted to said nozzles for rotating said nozzles.

13. The aircraft according to claim 1 wherein:
said plurality of nozzles comprises a first right nozzle, a second right nozzle; a first left nozzle, and a second left nozzle;
said first chamber directs air into said first right nozzle and said first left nozzle;
vortices generators in said first chamber for directing air into said first right nozzle and said first left nozzle.

14. The aircraft according to claim 1 wherein:
said drive shaft is mounted to bulwarks in a fan nacelle;
wherein said first fan said second fan and said drive shaft define a drive shaft unit that may be removed as a single piece for maintenance.

15. A method of flying an aircraft comprising:
rotating a drive shaft connected to a first fan and a second fan with a motor;
gearing up an output of said motor with a transmission in communication with said motor and said drive shaft;
drawing air through an intake with the first fan:
drawing air through a bypass duct with the second fan;
delivering air into a plurality of nozzles;
selectively rotating said nozzles for directing air flow in a selected one of a vertical or non-vertical direction;
delivering air into hover tubes for adjusting an orientation of said aircraft;
controlling airflow from said first fan to said second fan with a selectively openable valve that remains open to regulate air flow from said first fan to said second fan; and
wherein said selectively openable valve is a cone valve.

16. The method according to claim 15 further comprising:
controlling airflow through said bypass duct to said second fan with selectively openable doors to selectively restrict an intake of air, but not to close off airflow to said second chamber.

17. The method according to claim 15 further comprising:
controlling airflow through said bypass duct to said second fan with selectively openable bypass intake doors that remains open to regulate air flow from outside of the aircraft to said second fan;
wherein said selectively openable valve and said bypass intake doors are activated via a common signal for activating said valve and doors simultaneously for controlling airflow to said second fan.

18. The method according to claim 15 further comprising:
controlling a rudder, ailerons, and flaps for effecting control of the aircraft during conventional flight;
controlling a direction of air exiting hover controls on a first wing, a second wing and a tail section for controlling orientation of the aircraft for effecting hover control when the aircraft is in a hover condition;
augmenting flow through said hover controls with at least one inline fan for continuous expulsion of air from said hover controls;
wherein said steps of controlling during conventional flight and during said hover condition are implemented simultaneously during either said conventional flight or said hover condition.

19. The method according to claim 18 wherein:
said steps of controlling include receiving radio control signals from a transmitter.

20. The method according to claim 15 wherein said step of delivering air into hover tubes comprises the steps of:
continuously delivering air into said hover tubes; and
directing flow to one of several branches.

21. An aircraft comprising:
a fuselage defining a first wing, a second wing, and a tail section;
a compressor in said fuselage, said compressor defining an intake opening;
a first fan and a second fan in said compressor;
a drive shaft interconnecting said first fan and said second fan;
a motor for rotating said drive shaft;
a transmission in communication with said motor and said drive shaft for gearing up an output of said motor;
a bypass duct for directing airflow to a location in front of said second fan;
a plurality of nozzles for directing air flow out of said compressor in a selected one of a vertical or non-vertical direction;
hover tubes extending from said compressor to adjust the aircraft in pitch, yaw and roll; wherein
said compressor has a first chamber and a second chamber;
said first fan is in said first chamber;
said second fan in said second chamber;
said first chamber and said second chamber interconnected via a selectively openable valve that remains open to regulate air flow from said first fan to said second fan; and
said second fan continuously receives said at least a portion of airflow through a cone valve.

* * * * *

UNITED STATES PATENT AND TRADEMARK OFFICE
CERTIFICATE OF CORRECTION

| | | |
|---|---|---|
| PATENT NO. | : 8,960,592 B1 | Page 1 of 1 |
| APPLICATION NO. | : 13/553080 | |
| DATED | : February 24, 2015 | |
| INVENTOR(S) | : Windisch | |

It is certified that error appears in the above-identified patent and that said Letters Patent is hereby corrected as shown below:

In the claims

In column 24, line 51, delete the word "second".

Signed and Sealed this
Sixth Day of October, 2015

Michelle K. Lee
*Director of the United States Patent and Trademark Office*